US011541788B2

(12) United States Patent
Sakuma et al.

(10) Patent No.: US 11,541,788 B2
(45) Date of Patent: Jan. 3, 2023

(54) SEAT SUSPENSION

(71) Applicant: Kubota Corporation, Osaka (JP)

(72) Inventors: Tetsushi Sakuma, Sakai (JP); Daisuke Yasunobe, Sakai (JP); Takateru Nakagawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 665 days.

(21) Appl. No.: 16/563,940

(22) Filed: Sep. 9, 2019

(65) Prior Publication Data

US 2020/0079257 A1 Mar. 12, 2020

(30) Foreign Application Priority Data

Sep. 12, 2018 (JP) ............................. JP2018-170927

(51) Int. Cl.
*B60N 2/54* (2006.01)
*B60N 2/50* (2006.01)

(52) U.S. Cl.
CPC ............. *B60N 2/544* (2013.01); *B60N 2/505* (2013.01); *B60N 2/509* (2013.01); *B60N 2/502* (2013.01); *B60N 2/507* (2013.01); *B60N 2/508* (2013.01)

(58) Field of Classification Search
CPC ........ B60N 2/544; B60N 2/502; B60N 2/505; B60N 2/507; B60N 2/509; B60N 2/508
See application file for complete search history.

(56) References Cited

U.S. PATENT DOCUMENTS

| | | | | |
|---|---|---|---|---|
| 3,897,036 A * | 7/1975 | Nystrom | B60N 2/507 | 248/575 |
| 5,154,402 A * | 10/1992 | Hill | B60N 2/1615 | 74/528 |
| 2005/0242264 A1* | 11/2005 | John | B60N 2/544 | 248/424 |

FOREIGN PATENT DOCUMENTS

| | | | |
|---|---|---|---|
| DE | 102016112118 | 1/2018 | |
| DE | 102016112118 A1 * | 1/2018 | B60N 2/502 |
| JP | 56-036258 | 8/1979 | |
| JP | 61-076730 | 5/1986 | |
| JP | H05139195 A * | 6/1993 | |
| JP | 9-123817 | 5/1997 | |

OTHER PUBLICATIONS

Japanese Office Action for corresponding JP Application No. 2018-170927, dated Nov. 2, 2021 (w/ machine translation).

* cited by examiner

*Primary Examiner* — Tan Le
(74) *Attorney, Agent, or Firm* — Mori & Ward, LLP

(57) ABSTRACT

A seat suspension includes a base including a base hook and a seat platform provided with a seat. A first link couples a first rotational axis of the base and a third rotational axis of the seat platform and is configured to be rotatable about the first rotational axis and the third rotational axis. A second link couples a second rotational axis of the base and a fourth rotational axis of the seat platform and is configured to be rotatable about the second rotational axis and the fourth rotational axis. A link hook is provided on the second link. An elastic member is latched to the base hook and the link hook and is configured to pull the link hook toward the base hook. A first angle between a contracting direction of the elastic member and a rotation direction of the link hook increases as the elastic member expands.

11 Claims, 16 Drawing Sheets

SEAT SUSPENSION

CROSS-REFERENCE TO RELATED APPLICATIONS

The present application claims priority under 35 U.S.C. § 119 to Japanese Patent Application No. 2018-170927, filed Sep. 12, 2018. The contents of this application are incorporated herein by reference in their entirety.

BACKGROUND OF THE INVENTION

Field of the Invention

The present application discloses techniques relating to a seat suspension.

Discussion of the Background

JP 9-123817 A discloses a seat suspension for a work vehicle. The seat suspension includes a pair of parallel links and a tension spring disposed along a diagonal line of the parallel links, and is configured to absorb vibration of a machine body by means of elastic force of the tension spring. The seat suspension according to JP 9-123817 A is provided with a cushion inhibiting deterioration in suspension function of a sunk driver's seat.

SUMMARY OF THE INVENTION

According to one aspect of the present invention, a seat suspension includes a base, a seat platform, a first link, a second link, a link hook, and an elastic member. The base has a first rotational axis and a second rotational axis substantially parallel to the first rotational axis. The first rotational axis and the second rotational axis are provided to have a first distance in a distant direction between the first rotational axis and the second rotational axis. The base includes a base hook provided closer to the first rotational axis than to the second rotational axis in a seat anteroposterior direction substantially perpendicular to both the first rotational axis and the second rotational axis. The seat platform has a third rotational axis substantially parallel to the first rotational axis and a fourth rotational axis substantially parallel to the third rotational axis. The third rotational axis and the fourth rotational axis being provided to have the first distance in the distant direction between the third rotational axis and the fourth rotational axis. A seat is configured to be attached to the seat platform such that the seat has a backrest positioned closer to the fourth rotational axis than to the third rotational axis in the seat anteroposterior direction. The first link couples the first rotational axis and the third rotational axis such that a distance between the first rotational axis and the third rotational axis is a second distance. The first link is configured to be rotatable about the first rotational axis and the third rotational axis. The second link couples the second rotational axis and the fourth rotational axis such that a distance between the second rotational axis and the fourth rotational axis is the second distance. The second link is configured to be rotatable about the second rotational axis and the fourth rotational axis. The link hook is provided on the second link. The elastic member is latched to the base hook and the link hook and is configured to pull the link hook toward the base hook. The link hook is provided such that a first angle between a contracting direction of the elastic member and a rotation direction of the link hook increases as the elastic member expands.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
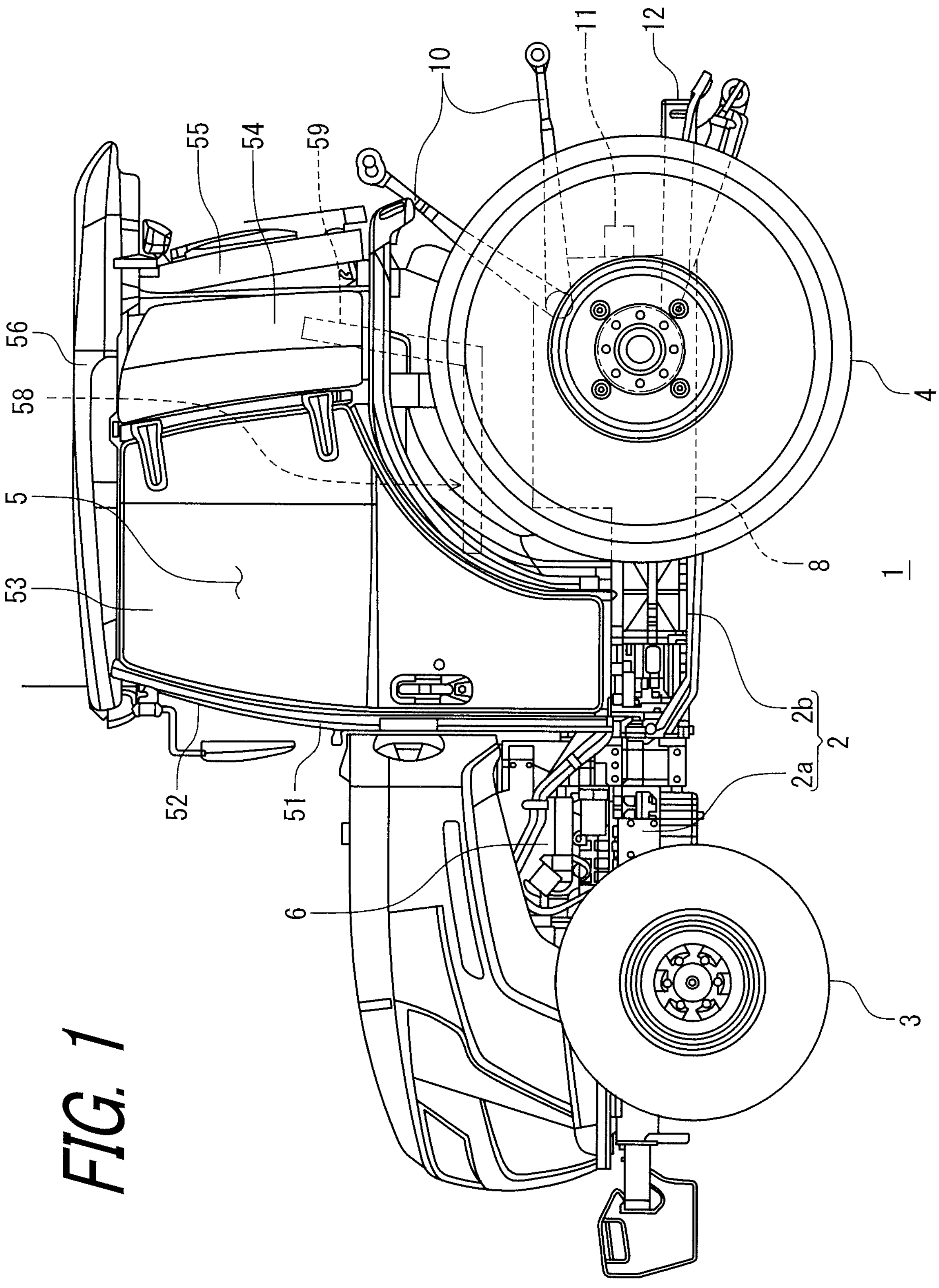
FIG. 1 is a side view of a work vehicle according to an embodiment.

The embodiments will now be described with reference to the accompanying drawings, wherein like reference numerals designate corresponding or identical elements throughout the various drawings.

Embodiments will now be described below with reference to the drawings. Same reference signs denote corresponding or identical configurations in the drawings.

First Embodiment

<Entire Configuration>

FIG. 1 is a side view of a work vehicle 1 according to the embodiment. Examples of the work vehicle 1 include an agricultural tractor. The work vehicle 1 includes a vehicle body frame 2, traveling wheels 3 and 4, and a driver's cab 5. The work vehicle 1 is preferably a four-wheel drive vehicle configured to rotary drive the four traveling wheels 3 and 4 to travel.

The embodiments in the present application refer to an anteroposterior direction indicating an anteroposterior direction viewed from an operator seated on a seat 58 provided in the driver's cab 5. A transverse direction and a lateral direction indicate a transverse direction and a lateral direction viewed from the operator. A vertical direction indicates a vertical direction viewed from the operator. In other words, these directions correspond to directions viewed from the operator having a back in contact with a backrest 59 of the seat 58. Assume that anteroposterior, transverse (lateral), and height directions of the work vehicle 1 and the seat 58 match the anteroposterior, transverse (lateral), and vertical directions viewed from the operator, respectively.

The vehicle body frame 2 includes a front frame 2*a* and a rear frame 2*b*. The front frame 2*a* is provided with an engine 6. The rear frame 2*b* is provided with the driver's cab 5 and a transmission case 8. The transmission case 8 accommodates a travel gearbox configured to transmit drive power from the engine 6 to the traveling wheels 3 and 4, and the like. The transmission case 8 further accommodates a work device gearbox configured to distribute motive power from the engine 6 to a work device (not depicted) separately from the traveling wheels 3 and 4, a clutch, and the like. The work device gearbox, the clutch, and the like constitute a motive power transmission system to be called a work transmission system.

The work vehicle 1 further includes a pair of lift arms 10, a PTO shaft 11, and a traction device 12. The lift arms 10 are provided respectively on right and left sides of the work vehicle 1 one by one. The lift arms 10 are each configured to swing upward and downward along with operation of a hydraulic lift cylinder included in the work transmission system. The PTO shaft 11 functions as an output shaft for motive power of the work transmission system. The pair of lift arms 10 are coupled to a link mechanism (not depicted), and the PTO shaft 11 is connected to a transmission shaft for transmission of motive power to a work device (not depicted) like a rotary tillage device coupled to the link mechanism. The traction device 12 includes a convey carrier (not depicted) coupled to a rear end of the work vehicle 1 for conveyance.

<Internal Configuration of Driver's Cab>

Figure 2:
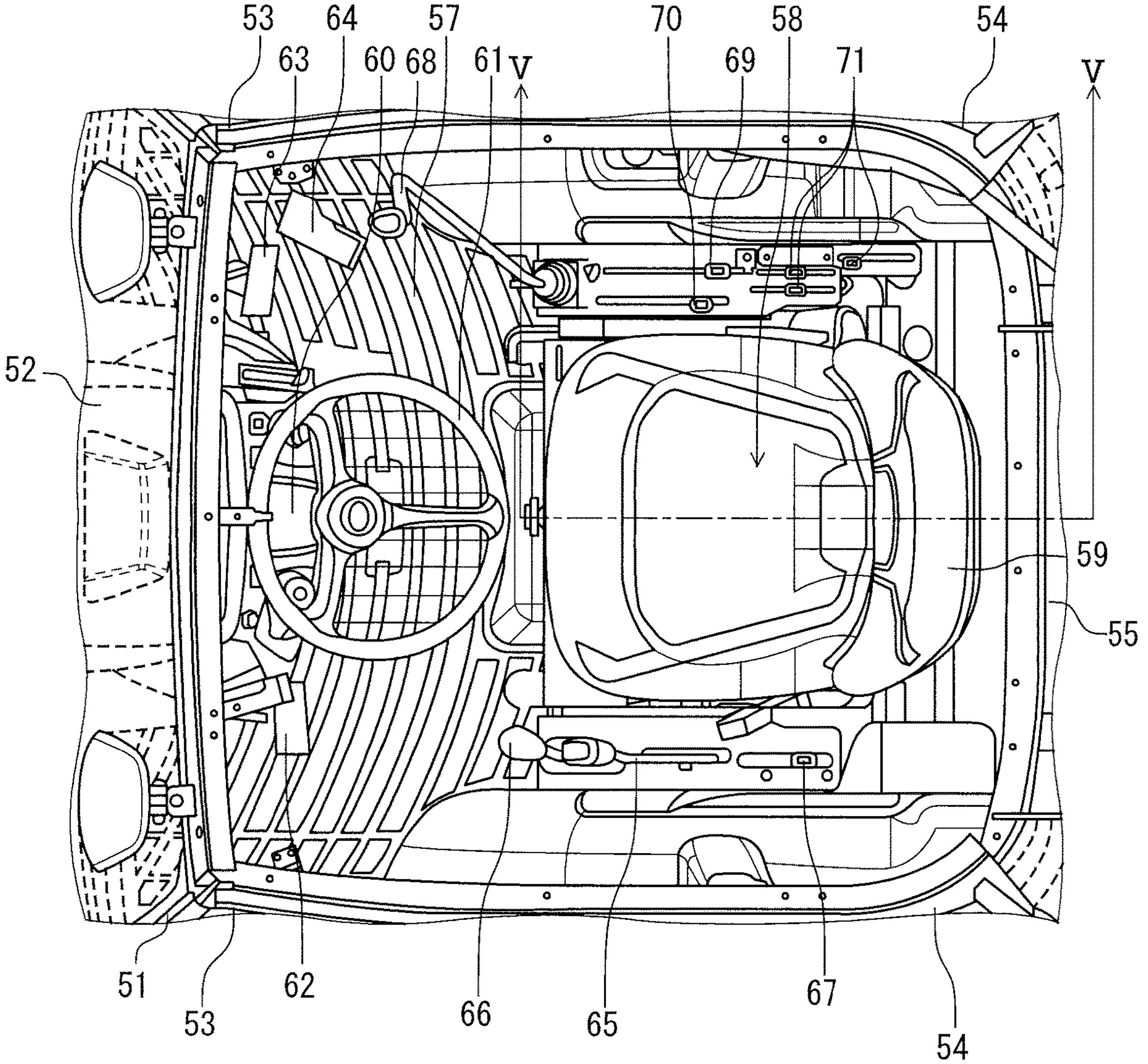
FIG. 2 is a plan view of a driver's cab in the work vehicle.

The driver's cab 5 is a space surrounded with a cabin frame 51, a windshield 52, door panels 53, side windows 54, a rear window 55, and a roof 56. The cabin frame 51 supports the windshield 52, the door panels 53, the side windows 54, the rear window 55, and the roof 56. The roof 56 has an internal storage space for an air conditioner, a wireless communication device, and the like. FIG. 2 is a plan view of an interior of the driver's cab 5 excluding the roof 56. The driver's cab 5 in the work vehicle 1 is provided therein with a floor panel 57 and the seat 58. The floor panel 57 constitutes a floor surface of the driver's cab 5. The floor panel 57 is provided therebehind with the seat 58. The seat 58 is mounted on a seat suspension 20 (see FIG. 3) to be described in detail later. The windshield 52 is transparent and constitutes a front end of the driver's cab 5. The door panels 53 are transparent and are provided at right and left ends of the driver's cab 5. The door panels 53 are outwardly openable. Being outwardly openable indicates being openable to be distant from the floor panel 57 and the seat 58. The side windows 54 are transparent and are provided at right and left ends of the driver's cab 5 and behind the door panels 53. The side windows 54 are also outwardly openable. The rear window 55 is transparent and constitutes a rear end of the driver's cab 5. The rear window 55 is also outwardly openable. As depicted in FIG. 2, the work vehicle 1 further includes a display 60, a steering wheel 61, a clutch pedal 62, a brake pedal 63, a speed control pedal 64, and the like, which are disposed behind the windshield 52 and ahead of the seat 58.

The work vehicle 1 includes a first operation lever 65, a second operation lever 66, and a third operation lever 67, which are disposed on the left of the seat 58 in the driver's cab 5. The first operation lever 65 is preferably configured as a shuttle shift lever. The first operation lever 65 is swingable anteroposteriorly. The first operation lever 65 tilted forward causes the work vehicle 1 to travel forward. The first operation lever 65 tilted backward causes the work vehicle 1 to travel backward. The second operation lever 66 is preferably configured to set whether or not to drive front wheels (the traveling wheels 3). The second operation lever 66 is disposed ahead of the first operation lever 65. The second operation lever 66 is swingable anteroposteriorly. When the second operation lever 66 is tilted forward, the front wheels 3 may be driven to achieve four-wheel drive travel of the work vehicle 1 ("4WD ON"). When the second operation lever 66 is tilted backward, only rear wheels 4 may be driven to achieve two-wheel drive travel of the work vehicle 1 ("4WD OFF"). The second operation lever 66 may alternatively be configured to turn OFF four-wheel drive when being tilted forward and turn ON four-wheel drive when being tilted backward. The third operation lever 67 is configured as a gear shift lever. The first operation lever 21 preferably has three gear levels of LOW, MIDDLE, and HIGH, which are selected for low-speed travel, middle-speed travel, and high-speed travel, respectively. The third operation lever 67 is slidable anteroposteriorly. The third operation lever 67 may be slid forward to set the gear level to LOW. The third operation lever 67 may be slid to the middle to set the gear level to MIDDLE. The third operation lever 67 may be slid backward to set the gear level to HIGH. The third operation lever 67 may alternatively be configured to set the gear level to HIGH when slid forward and set the gear level to LOW when slid backward. The second and third operation levers 66 and 67 are mechanically connected to the travel gearbox and the like accommodated in the transmission case 8. Each of the second and third operation levers 66 and 67 may alternatively be electrically connected, via a switch or the like, to the travel gearbox and the like accommodated in the transmission case 8.

The work vehicle 1 includes a fourth operation lever 68, a fifth operation lever 69, a sixth operation lever 70, and seventh operation levers 71, which are disposed on the right of the seat 58 in the driver's cab 5. The fourth operation lever 68 is relevant to the work transmission system (output from the PTO shaft 11). The fifth operation lever 69 is configured to vertically shift the work device (not depicted). The fifth operation lever 69 is swingable anteroposteriorly. When the fifth operation lever 69 is tilted backward, the lift arms 10 may shift the work device upward. When the fifth operation lever 69 is tilted forward, the lift arms 10 may shift the work device downward. Alternatively, the fifth operation lever 69 tilted backward may cause the lift arms 10 to shift the work device downward, and the fifth operation lever 69 tilted forward may cause the lift arms 10 to shift the work device upward. The sixth operation lever 70 is configured to set for control of the lift arms 10 to shift the work device vertically in accordance with unevenness or hardness of soil (cause the work device to follow change of soil) for achievement of constant tractive force of the work device as much as possible, or to set for control of the lift arms 10 not to cause the work device to follow such change of soil. The sixth operation lever 70 is swingable anteroposteriorly. When the sixth operation lever 70 is tilted backward, the work vehicle 1 may control the lift arms 10 to cause the work device to follow change of soil. When the sixth operation lever 70 is tilted forward, the work vehicle 1 may control the lift arms 10 not to cause the work device to follow change of soil. The work vehicle 1 is also configured to control the lift arms 10 to float the work device above soil. When the sixth operation lever is further tilted forward from a position for not causing the work device to follow change of soil, the work vehicle 1 may control the lift arms 10 to float the work device above soil. The seventh operation levers 71 include levers configured to directly control the lift cylinders of the lift arms 10.

<Details of Seat Suspension>

Figure 3:
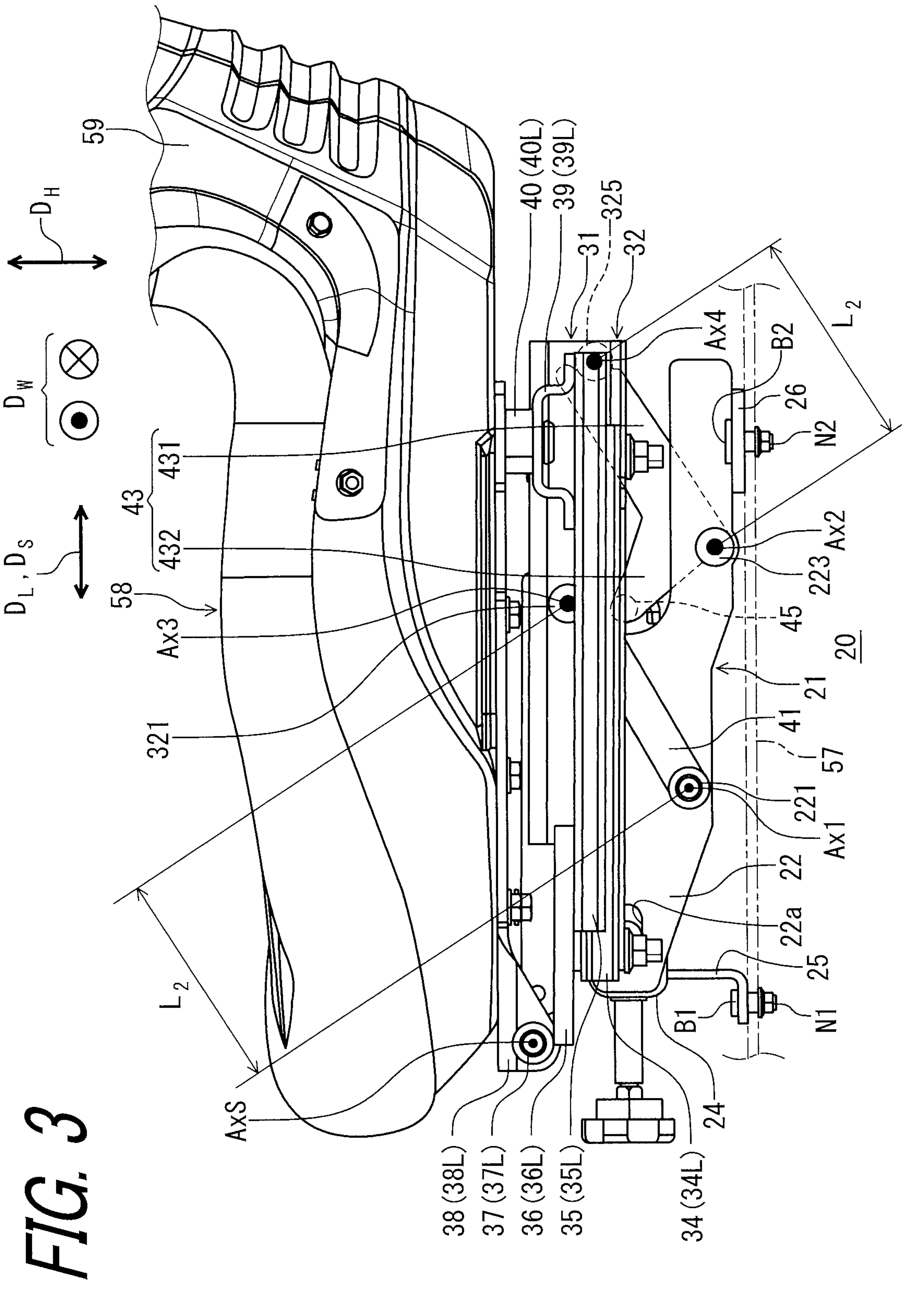
FIG. 3 is a side view of a seat, and a seat suspension according to a first embodiment.

With reference to FIG. 3, the seat suspension 20 includes a base 21, a seat platform 31, a first link 41, and a second link 43. The base 21 is mounted on the floor panel 57. The first link 41 and the second link 43 constitute parallel links and are each rotatably connected to the base 21 and the seat platform 31. The seat platform 31 includes a Z bar 32 having a web connected to the first link 41 and the second link 43. The seat suspension 20 further includes a rail 34, a slider 35, bracket attachment 36, a pin 37, a seat bracket 38, a cushion mounting fitting 39, and a seat cushion rubber member 40.

The rail 34 is provided on a lower flange of the Z bar 32 and extends in a sliding direction $D_S$. The sliding direction $D_S$ according to the present embodiment matches the anteroposterior direction of the seat 58 (seat anteroposterior direction $D_L$). The sliding direction $D_S$ may not necessarily match the anteroposterior direction of the seat 58 (the seat anteroposterior direction $D_L$). The slider 35 is mounted on the rail 34 so as to be slidable on the rail 34 in the sliding direction $D_S$. The slider 35 according to the present embodiment is mounted on the rail 34 in a height direction $D_H$ of the seat suspension 20. The slider 35 may alternatively be mounted on the rail 34 in a different direction perpendicular to the sliding direction $D_S$.

The bracket attachment 36 is attached onto a front end of the slider 35 in the seat anteroposterior direction $D_L$ (a first end of the slider 35 in the sliding direction $D_S$). The seat bracket 38 is connected to the bracket attachment 36 via the pin 37. The seat bracket 38 is rotatable about a center shaft $A_{XS}$ of the pin 37 with respect to the bracket attachment 36. The center shaft $A_{XS}$ of the pin 37 is substantially perpendicular to the sliding direction $D_S$. The seat bracket 38 is provided thereon with the seat 58. That is, the seat 58 is mounted above the slider 35 in the height direction $D_H$. The height direction $D_H$ generally matches the height direction of the seat 58. The height direction $D_H$ is substantially perpendicular to the seat anteroposterior direction $D_L$. The cushion mounting fitting 39 is attached onto a rear end of the slider 35 in the seat anteroposterior direction $D_L$ (a second end of the slider 35 in the sliding direction $D_S$). The seat bracket 38 rotates about the center shaft $A_{XS}$ with respect to the bracket attachment 36, and has a lower surface in contact with an upper surface of the seat cushion rubber member 40. The cushion mounting fitting 39 retains the seat cushion rubber member 40 such that the upper surface of the seat cushion rubber member 40 is positioned appropriately even when the operator is seated on the seat 58. The cushion mounting fitting 39 is attached onto a rear end of the slider 35 in the seat anteroposterior direction $D_L$ (a second end of the slider 35 in the sliding direction $D_S$).

Figure 4:
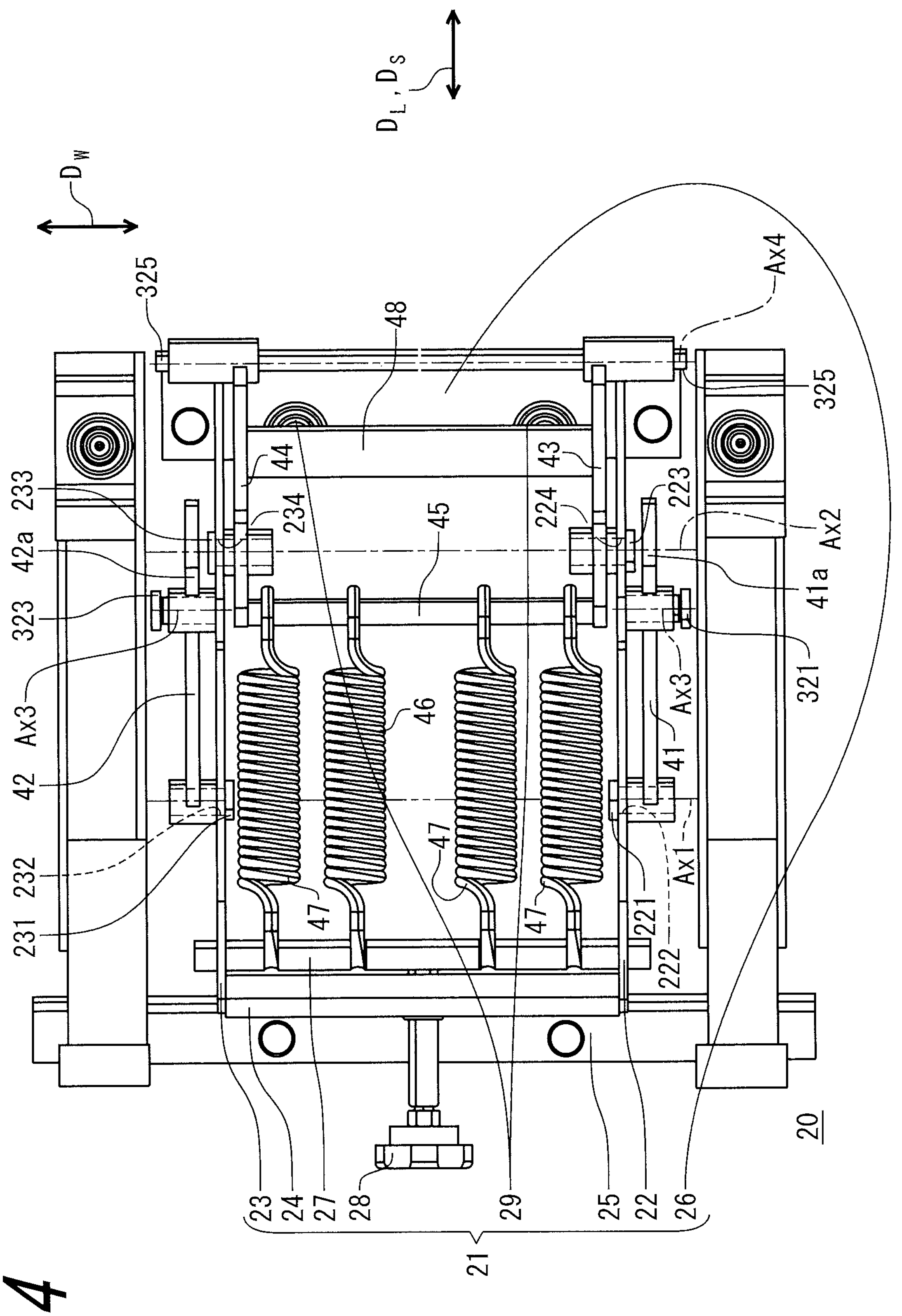
FIG. 4 is a top view of the seat suspension depicted in FIG. 3 and excluding a seat bracket and a seat platform.
Figure 5:
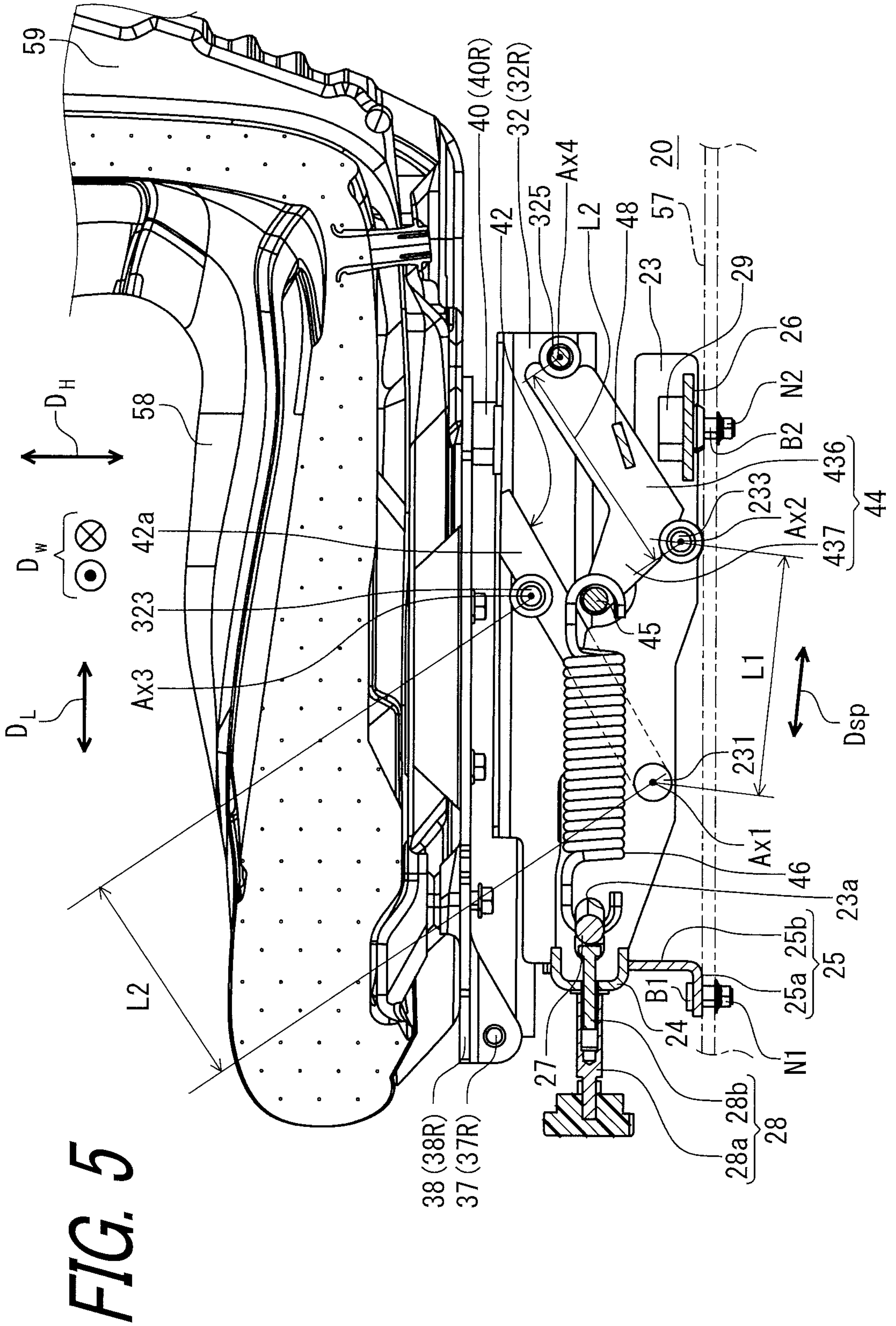
FIG. 5 is a sectional view taken along line V-V indicated in FIG. 2, of the seat, and the seat suspension depicted in FIG. 3.
Figure 6:
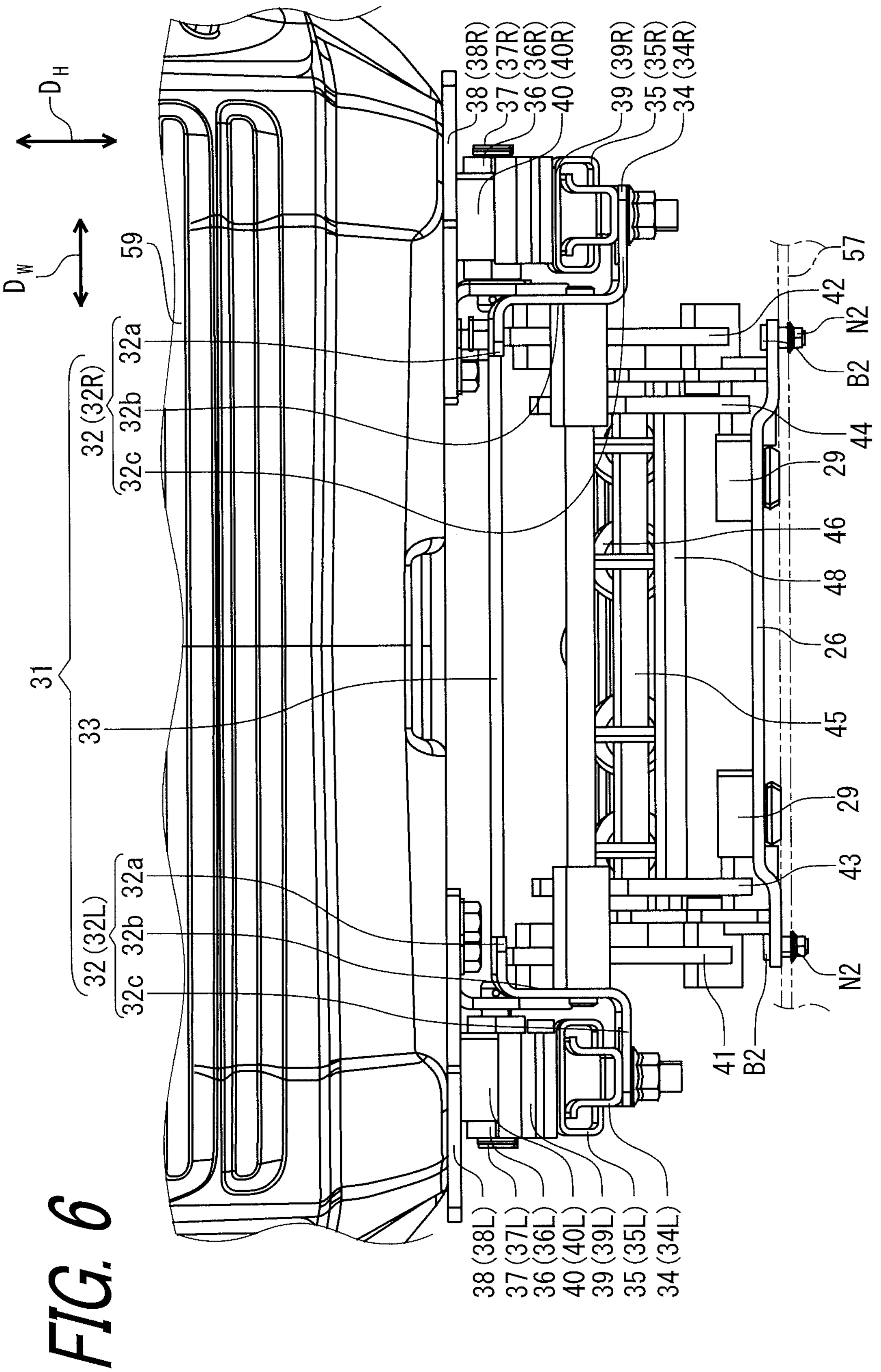
FIG. 6 is a rear view of the seat, and the seat suspension depicted in FIG. 3.

FIG. 4 is a top view of the seat suspension 20 excluding the seat bracket 38 and the seat platform 31. With reference to FIG. 4, the base 21 includes a left base plate 22, a right base plate 23, a front base plate 24, a front base attachment plate 25, and a rear base plate 26. The left base plate 22 and the right base plate 23 are aligned in a lateral direction $D_W$ (width direction $D_W$) of the seat suspension 20. The width direction $D_W$ generally matches the lateral direction of the seat 58 and is perpendicular to the sliding direction $D_S$. The left base plate 22 and the right base plate 23 extend in the anteroposterior direction $D_L$ of the seat 58 (the seat anteroposterior direction $D_L$). The front base plate 24 connects a front end of the left base plate 22 and a front end of the right base plate 23, and extends in the width direction $D_W$. As depicted in FIG. 5, the front base plate 24 is a tabular plate bent along an outer periphery of the front end of the left base plate 22 and an outer periphery of the front end of the right base plate 23, and has a U shape when viewed in the width direction $D_W$. The front base attachment plate 25 is connected to a lower end of the front base plate 24, extends downward $D_D$ from the lower end, and is then bent forward. The front base attachment plate 25 has an attachment part **25*a* extending in the seat anteroposterior direction $D_L$, and a support part 25*b* connected to the attachment part 25*a* and the front base plate 24 and extending in the height direction $D_H$. The attachment part 25*a* and the support part 25*b* are formed by bending a single plate. The attachment part 25*a* is in contact with the floor panel 57 and is attached to the floor panel 57 by means of a bolt B1 and a nut N1. The support part 25*b* supports the front base plate 24. The rear base plate 26 connects a rear end of the left base plate 22 and a rear end of the right base plate 23. As depicted in FIG. 6, the rear base plate 26 has a center portion in the width direction $D_W$ shifted upward in the height direction $D_H$ from an end portion of the rear base plate 26 in the width direction $D_W$. The center portion of the rear base plate 26 floating above the floor panel 57 is thus attached to the floor panel 57. The end portion of the rear base plate 26 is attached to the floor panel 57 by means of a plurality of bolts B2 and a plurality of nuts N2**.

As depicted in FIG. 4, the pair of the first and second links 41 and 43 are disposed on a first side of the seat 58 in the transverse direction $D_W$. The seat suspension 20 further includes a pair of first and second additional links 42 and 44 disposed on a side opposite to the first side. The first link 41 and the first additional link 42 are configured substantially identically, whereas the second link 43 and the second additional link 44 are configured substantially identically. The first link 41 and the second link 43 may alternatively be disposed at the center of the seat 58 in the transverse direction $D_W$, without provision of the first additional link 42 and the second additional link 44.

According to the embodiment relevant to FIG. 4, the left base plate 22 is interposed between the first link 41 and the second link 43. The right base plate 23 is interposed between the first additional link 42 and the second additional link 44. Alternatively, the left base plate 22 may be interposed between the first additional link 42 and the second additional link 44, and the right base plate 23 may be interposed between the first link 41 and the second link 43. The second link 43 and the second additional link 44 according to the present embodiment are positioned between the first link 41 and the first additional link 42 in the width direction $D_W$. The first link 41 and the first additional link 42 may alternatively be positioned between the second link 43 and the second additional link 44 in the width direction $D_W$.

As depicted in FIGS. 4 and 5, the base 21 has a first rotational axis Ax1, and a second rotational axis Ax2 substantially parallel to the first rotational axis Ax1 and distant from the first rotational axis Ax1 by a first distance $L_1$ in a distant direction $D_{SP}$. The first rotational axis Ax1 and the second rotational axis Ax2 are substantially perpendicular to the seat anteroposterior direction $D_L$ and the height direction $D_H$. The first rotational axis Ax1 and the second rotational axis Ax2 extend substantially parallelly in the width direction $D_W$. The distant direction $D_{SP}$ may not necessarily match the seat anteroposterior direction $D_L$ but may be slant from the seat anteroposterior direction $D_L$.

Specifically, the left base plate 22 and the right base plate 23 have through holes 222 and 232 each having a center axis along the first rotational axis Ax1 and penetrated by pins 221 and 231, respectively. The pin 221 is press fitted to the first link 41. When the pin 221 being in sliding contact with an outer peripheral wall of the through hole 222 rotates, the first link 41 rotates about the first rotational axis Ax1 with respect to the base 21. The pin 231 is press fitted to the first additional link 42. When the pin 231 being in sliding contact with an outer peripheral wall of the through hole 232 rotates, the first additional link 42 rotates about the first rotational axis Ax1 with respect to the base 21. The left base plate 22 and the right base plate 23 have through holes 224 and 234 each having a center axis along the second rotational axis Ax2 and penetrated by pins 223 and 233, respectively. The pin 223 is press fitted to the second link 43. When the pin 223 being in sliding contact with an outer peripheral wall of the through hole 224 rotates, the second link 43 rotates about the second rotational axis Ax2 with respect to the base 21. The pin 223 is disposed to extend, with respect to the left base plate 22, in a direction opposite to an extending direction of the pin 221 in the width direction $D_W$. The pin 233 is press fitted to the second additional link 44. When the pin 233 being in sliding contact with an outer peripheral wall of the through hole 234 rotates, the second additional link 44 rotates about the second rotational axis Ax2 with respect to the base 21. The pin 233 is disposed to extend, with respect to the right base plate 23, in a direction opposite to an extending direction of the pin 231 in the width direction $D_W$.

Figure 7:
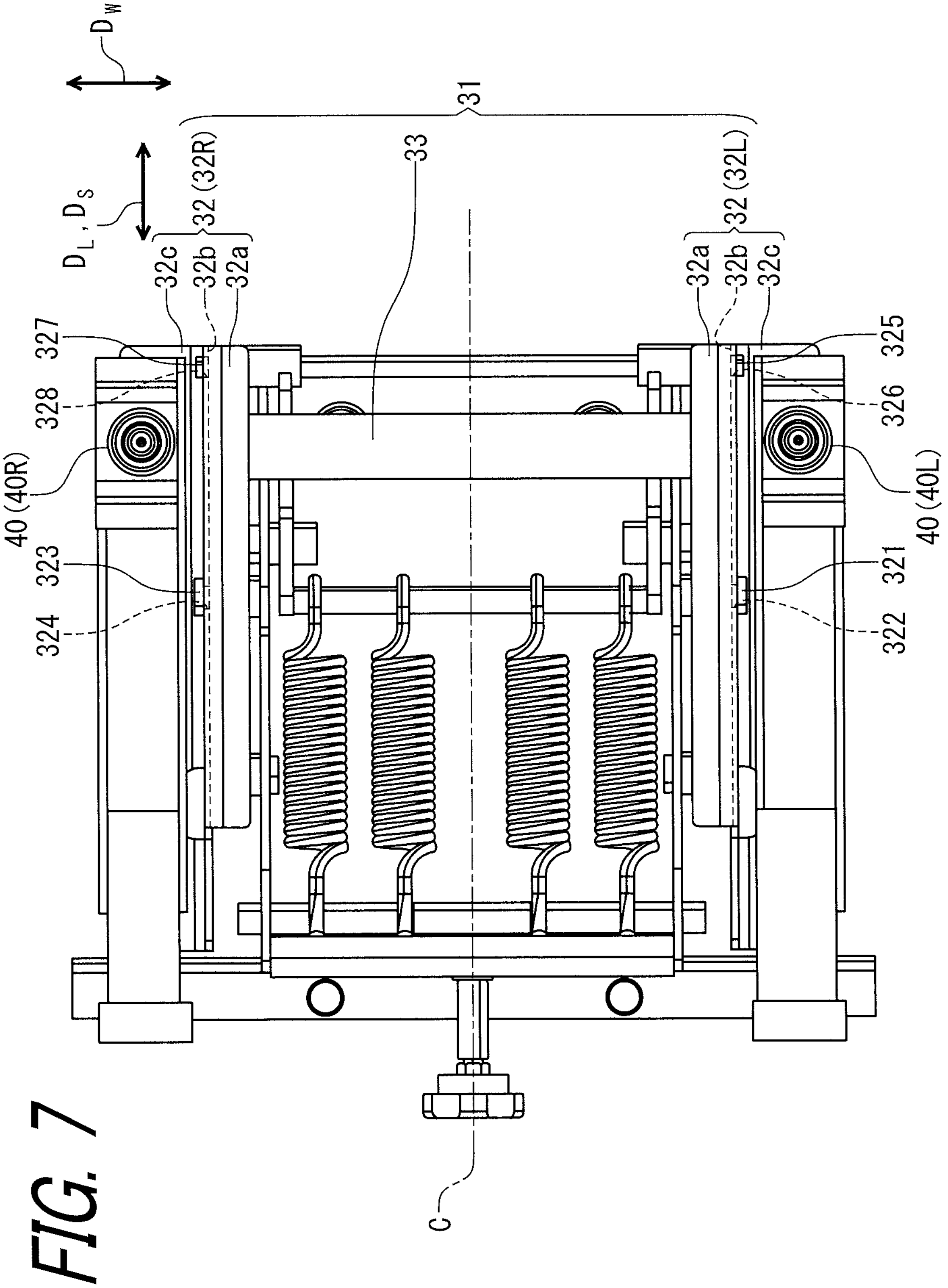
FIG. 7 is a top view of the seat suspension depicted in FIG. 3 and excluding the seat bracket.

The seat platform 31 is supported by the base 21 via the first link 41 and the second link 43. More specifically, the seat platform 31 is supported by the base 21 via the first link 41, the first additional link 42, the second link 43, and the second additional link 44. As depicted in FIGS. 6 and 7, the seat platform 31 includes a left Z bar 32L, a right Z bar 32R, and a brace 33 connecting the left Z bar 32L and the right Z bar 32R. Each of the left Z bar 32L and the right Z bar 32R may be generally called the Z bar 32. The Z bar 32 has an upper flange 32*a*, a web 32*b*, and a lower flange 32*c*. The upper flange 32*a* of the Z bar 32 extends from the web 32*b* toward a center C of the base 21 in the width direction $D_W$. Specifically, the upper flange 32*a* of the left Z bar 32L extends to the right whereas the upper flange 32*a* of the right Z bar 32R extends to the left. The brace 33 couples the upper flange 32*a* of the left Z bar 32L and the upper flange 32*a* of the right Z bar 32R.

The web 32*b* of the Z bar 32 is connected to the first link 41 and the second link 43. According to the present embodiment, the first link 41 and the second link 43 are connected to the web 32*b* of the left Z bar 32L. The first additional link 42 and the second additional link 44 are connected to the web 32*b* of the right Z bar 32R. Alternatively, the first link 41 and the second link 43 may be connected to the web 32*b* of the right Z bar 32R whereas the first additional link 42 and the second additional link 44 may be connected to the web 32*b* of the left Z bar 32L.

The lower flange 32*c* of the Z bar 32 is provided with the rail 34, the slider 35, the bracket attachment 36, the pin 37, the seat bracket 38, the cushion mounting fitting 39, and the seat cushion rubber member 40, as described earlier. FIG. 6 depicts the rail 34, the slider 35, the bracket attachment 36, the pin 37, the seat bracket 38, the cushion mounting fitting 39, and the seat cushion rubber member 40, which are mounted on the lower flange 32*c* of the left Z bar 32L and are denoted as the rail 34L, the slider 35L, the bracket attachment 36L, the pin 37L, the seat bracket 38L, the cushion mounting fitting 39L, and the seat cushion rubber member 40L, respectively. FIG. 6 further depicts the rail 34, the slider 35, the bracket attachment 36, the pin 37, the seat bracket 38, the cushion mounting fitting 39, and the seat cushion rubber member 40, which are mounted on the lower flange 32*c* of the right Z bar 32R and are denoted as the rail 34R, the slider 35R, the bracket attachment 36R, the pin 37R, the seat bracket 38R, the cushion mounting fitting 39R, and the seat cushion rubber member 40R, respectively. The rail 34R is distant from the rail 34L in the width direction $D_W$ and extends parallelly to the rail 34L. The slider 35L and the slider 35R are mounted on the rail 34L and the rail 34R in the height direction $D_H$, and are slidable on the rail 34L and the rail 34R in the sliding direction $D_s$, respectively.

The seat platform 31 has a third rotational axis Ax3 substantially parallel to the first rotational axis Ax1, and a fourth rotational axis Ax4 substantially parallel to the third rotational axis Ax3 and distant from the third rotational axis Ax3 by the first distance $L_1$ in the distant direction $D_{SP}$. The third rotational axis Ax3 and the fourth rotational axis Ax4 extend substantially perpendicularly to the seat anteroposterior direction $D_L$ and the height direction $D_H$. Specifically, the web 32*b* of the left Z bar 32L has a through hole 322 penetrated by a pin 321 having a center axis along the third rotational axis Ax3. The pin 321 is press fitted to the first link 41. When the pin 321 being in sliding contact with an outer peripheral wall of the through hole 322 rotates, the first link 41 rotates about the third rotational axis Ax3 with respect to the base 21. The web 32*b* of the right Z bar 32R has a through hole 324 penetrated by a pin 323 having a center axis along the third rotational axis Ax3. The pin 323 is press fitted to the first additional link 42. When the pin 323 being in sliding contact with an outer peripheral wall of the through hole 324 rotates, the first additional link 42 rotates about the third rotational axis Ax3 with respect to the base 21. The web 32*b* of the left Z bar 32L has a through hole 326 penetrated by a pin 325 having a center axis along the fourth rotational axis Ax4. The pin 325 is press fitted to the second link 43. When the pin 325 being in sliding contact with an outer peripheral wall of the through hole 326 rotates, the second link 43 rotates about the fourth rotational axis Ax4 with respect to the base 21. The pin 325 is disposed to extend, with respect to web 32*b* of the left Z bar 32L, also in a direction opposite to an extending direction of the pin 321 in the width direction $D_W$. The web 32*b* of the right Z bar 32R has a through hole 328 penetrated by the pin 325 having a center axis along the fourth rotational axis Ax4. The pin 325 is press fitted to the second additional link 44. When the pin 325 being in sliding contact with an outer peripheral wall of the through hole 328 rotates, the second additional link 44 rotates about the fourth rotational axis Ax4 with respect to the base 21. The pin 325 is disposed to extend, with respect to web 32*b* of the right Z bar 32R, also in a direction opposite to an extending direction of the pin 323 in the width direction $D_W$. The pin 325 according to the embodiment described above is configured as a rod penetrating both the second link 43 and the second additional link 44. There may alternatively be provided a pin press fitted to the second link 43 and another pin press fitted to the second additional link 44.

Figure 8:
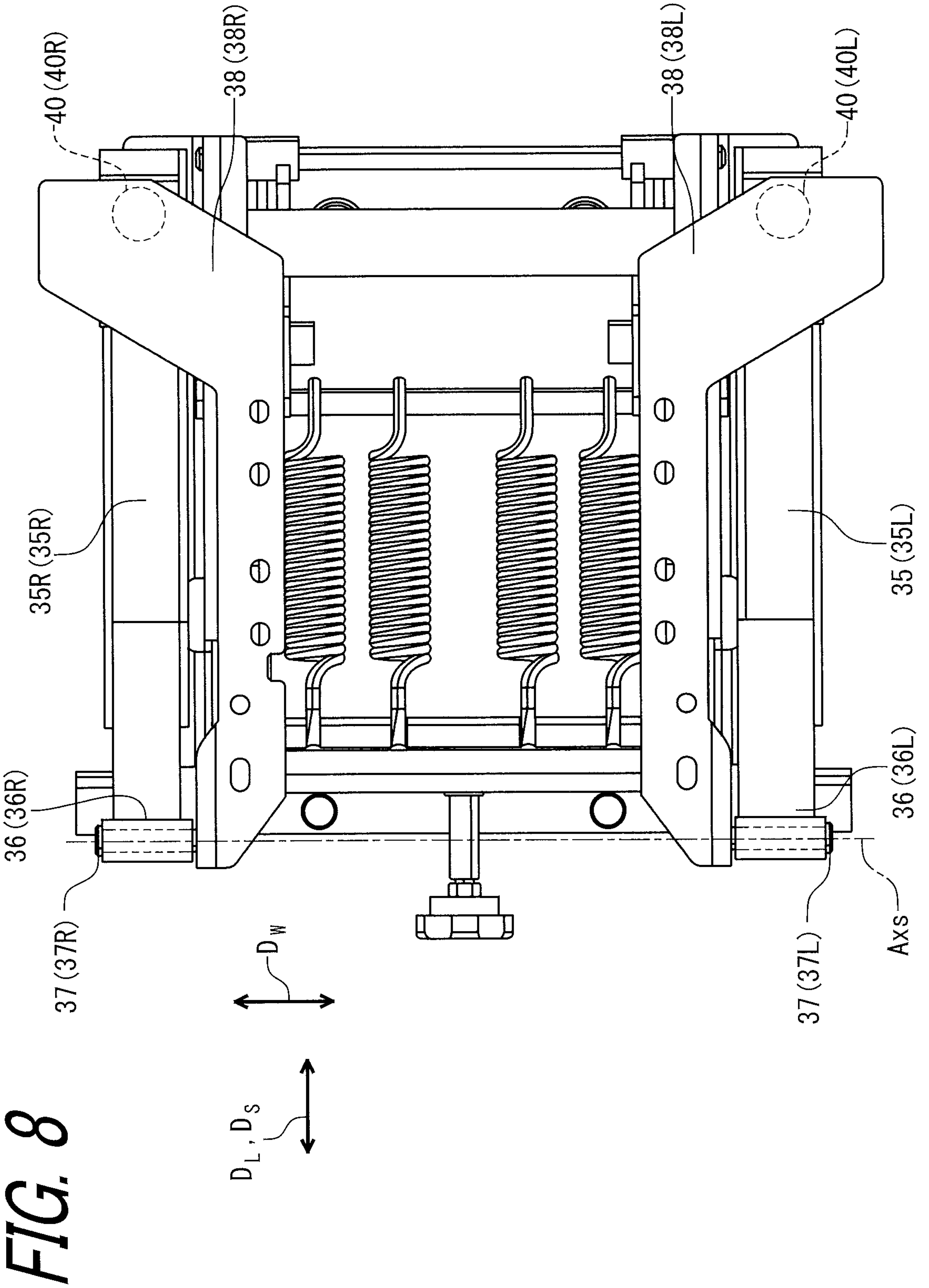
FIG. 8 is a top view of the seat suspension depicted in FIG. 3.

As depicted in FIGS. 3 and 5, the seat platform 31 is provided thereon with the seat 58 such that the backrest 59 of the seat 58 is positioned closer to the fourth rotational axis Ax4 than to the third rotational axis Ax3 in the seat anteroposterior direction $D_L$. More specifically, the seat 58 is placed on the seat brackets 38L and 38R such that the backrest 59 of the seat 58 is positioned closer to the fourth rotational axis Ax4 than to the third rotational axis Ax3 in the seat anteroposterior direction $D_L$. As depicted in FIG. 8, the seat brackets 38L and 38R support left and right portions of the seat 58, respectively, and rotate about the center shaft $A_{XS}$ with respect to the bracket attachment 36 so as to come into contact with the seat cushion rubber members 40L and 40R, respectively.

As depicted in FIG. 3, the first link 41 receives the press fitted pins 221 and 321 configured as described above, thus couples the first rotational axis Ax1 and the third rotational axis Ax3 such that a distance between the first rotational axis Ax1 and the third rotational axis Ax3 is a second distance $L_2$, and is rotatable about the first rotational axis Ax1 and the third rotational axis Ax3. The first link 41 is constituted by a linear arm.

The second link 43 receives the press fitted pins 223 and 325 configured as described above, thus couples the second rotational axis Ax2 and the fourth rotational axis Ax4 such that a distance between the second rotational axis Ax2 and the fourth rotational axis Ax4 is the second distance $L_2$, and is rotatable about the second rotational axis Ax2 and the fourth rotational axis Ax4. The second link 43 according to the present embodiment has a bell crank structure having the second rotational axis Ax2 as a fulcrum, and includes a main arm 431 extending from the second rotational axis Ax2 to the fourth rotational axis Ax4 and an auxiliary arm 432 extending from the second rotational axis Ax2 in a direction different from an extending direction of the main arm 431. The auxiliary arm 432 has a distal end provided with a link hook 45. That is, the seat suspension 20 includes the link hook 45 provided at the second link 43. The auxiliary arm 432 extends from the second rotational axis Ax2 to the link hook 45. The present embodiment provides about 90 degrees as an angle between a direction from the second rotational axis Ax2 to the fourth rotational axis Ax4 and a direction from the second rotational axis Ax2 to the link hook 45 when viewed in the width direction $D_W$. The second link 43 does not necessarily have the bell crank structure but may alternatively have a T link structure. The auxiliary arm 432 may have any shape extending from the main arm 431 to the link hook 45. When viewed in the width direction $D_W$, the angle between the direction from the second rotational axis Ax2 to the fourth rotational axis Ax4 and the direction from the second rotational axis Ax2 to the link hook 45 may not necessarily have about 90 degrees.

As depicted in FIG. 5, the first additional link 42 receives the press fitted pins 231 and 323 configured as described above, thus couples the first rotational axis Ax1 and the third rotational axis Ax3 such that a distance between the first rotational axis Ax1 and the third rotational axis Ax3 is the second distance $L_2$, and is rotatable about the first rotational axis Ax1 and the third rotational axis Ax3. The first additional link 42 is constituted by a linear arm.

The second additional link 44 receives the press fitted pins 233 and 325 configured as described above, thus couples the second rotational axis Ax2 and the fourth rotational axis Ax4 such that a distance between the second rotational axis Ax2 and the fourth rotational axis Ax4 is the second distance $L_2$, and is rotatable about the second rotational axis Ax2 and the fourth rotational axis Ax4. The second additional link 44 according to the present embodiment has a bell crank structure having the second rotational axis Ax2 as a fulcrum, and includes a main arm 436 extending from the second rotational axis Ax2 to the fourth rotational axis Ax4 and an auxiliary arm 437 extending from the second rotational axis Ax2 in a direction different from an extending direction of the main arm 436. The auxiliary arm 437 has a distal end provided with the link hook 45. That is, the auxiliary arm 437 extends from the second rotational axis Ax2 to the link hook 45. The present embodiment provides about 90 degrees as an angle between a direction from the second rotational axis Ax2 to the fourth rotational axis Ax4 and a direction from the second rotational axis Ax2 to the link hook 45 when viewed in the width direction $D_W$. The second additional link 44 may not necessarily have the bell crank structure but may alternatively have a T link structure. The auxiliary arm 437 may have any shape extending from the main arm 436 to the link hook 45. When viewed in the width direction $D_W$, the angle between the direction from the second rotational axis Ax2 to the fourth rotational axis Ax4 and the direction from the second rotational axis Ax2 to the link hook 45 may not necessarily have about 90 degrees.

As depicted in FIGS. 4 and 5, the base 21 is provided with a base hook 27 disposed closer to the first rotational axis Ax1 than to the second rotational axis Ax2 in the seat anteroposterior direction $D_L$. The seat suspension 20 includes an elastic member 46 latched to the base hook 27 and the link hook 45 to pull the link hook 45 toward the base hook 27. The base hook 27 and the link hook 45 according to the present embodiment are each constituted by a rod. The base hook 27 has a groove positioned where the elastic member 46 is latched. The link hook 45 may have a similar groove. The elastic member 46 according to the present embodiment is constituted by a tension spring. The elastic member 46 may alternatively be constituted by a rubber member. As depicted in FIG. 4, the elastic member 46 is disposed between the first link 41 and the first additional link 42 in the width direction $D_W$. The elastic member 46 is disposed between the second link 43 and the second additional link 44 in the width direction $D_W$. The first additional link 42 is thus disposed opposite to the first link 41 with respect to the elastic member 46 in the width direction $D_W$. The second additional link 44 is disposed opposite to the second link 43 with respect to the elastic member 46 in the width direction $D_W$. The seat suspension 20 may alternatively include a plurality of elastic members 46 and 47 disposed between the first link 41 and the first additional link 42 in the width direction $D_W$. In other words, the seat suspension 20 may further include at least one additional elastic member 47 that is provided between the first link 41 and the first additional link 42 as well as between the second link 43 and the second additional link 44 in the width direction $D_W$ and is latched to the base hook 27 and the link hook 45 to pull the link hook 45 toward the base hook 27. The seat suspension 20 according to the present embodiment exemplarily includes four elastic members 46 and 47, but has only to have at least one elastic member 46 and at least one elastic member 47.

The base 21 further includes an adjuster 28 connected to the base hook 27 to adjust positioning of the base hook 27 in the seat anteroposterior direction $D_L$. As depicted in FIG. 5, the adjuster 28 includes an operation knob 28*a* rotationally attached to the front base plate 24, and a male screw 28*b* attached to the base hook 27 and screwed to a female screw provided in the operation knob 28*a*. When the operation knob 28*a* is operated to rotate, the male screw 28*b* and the base hook 27 shift in the seat anteroposterior direction $D_L$ to adjust tension of the elastic members 46 and 47. As depicted in FIGS. 3 and 5, the left base plate 22 and the right base plate 23 have through holes 22*a* and 23*a* restricting shift of the base hook 27 in the height direction $D_H$, respectively. The rod constituting the base hook 27 penetrates both the through holes 22*a* and 23*a*.

As depicted in FIGS. 4 and 5, the first link 41 and the first additional link 42 have link extensions 41*a* and 42*a*, respectively, which extend in a direction opposite to a direction from the third rotational axis Ax3 to the first rotational axis Ax1. Each of the first link 41 and the first additional link 42 thus has a trapezoidal shape when viewed in the width direction $D_W$. The link extensions 41*a* and 42*a* can be in contact with a lower surface of the upper flange 32*a* of the left Z bar 32L and a lower surface of the upper flange 32*a* of the right Z bar 32R, respectively. Specifically, as depicted in FIG. 5, the link extensions 41*a* and 42*a* are each in contact with the lower surface of the upper flange 32*a* when the operator is not seated on the seat 58 and the elastic members 46 and 47 each pull the link hook 45 toward the base hook 27. This restricts upward and forward shift of the seat 58 positioned to allow each of the link extensions 41*a* and 42*a* to be in contact with the lower surface of the upper flange 32*a*.

As depicted in FIGS. 4 to 6, the seat suspension 20 further includes a stopper 48 restricting downward and backward shift of the seat 58. The stopper 48 according to the present embodiment is constituted by a plate extending from the second link 43 to the second additional link 44. The stopper 48 is not limited to this shape, but may be attached to only one of the second link 43 and the second additional link 44 or may be attached to at least one of the first link 41 and the first additional link. The base 21 further includes a stopper cushion rubber member 29 attached to the rear base plate 26. The stopper cushion rubber member 29 comes into contact with the stopper 48 when the seat 58 shifts backward and downward to maximum allowable ranges.

Figure 9:
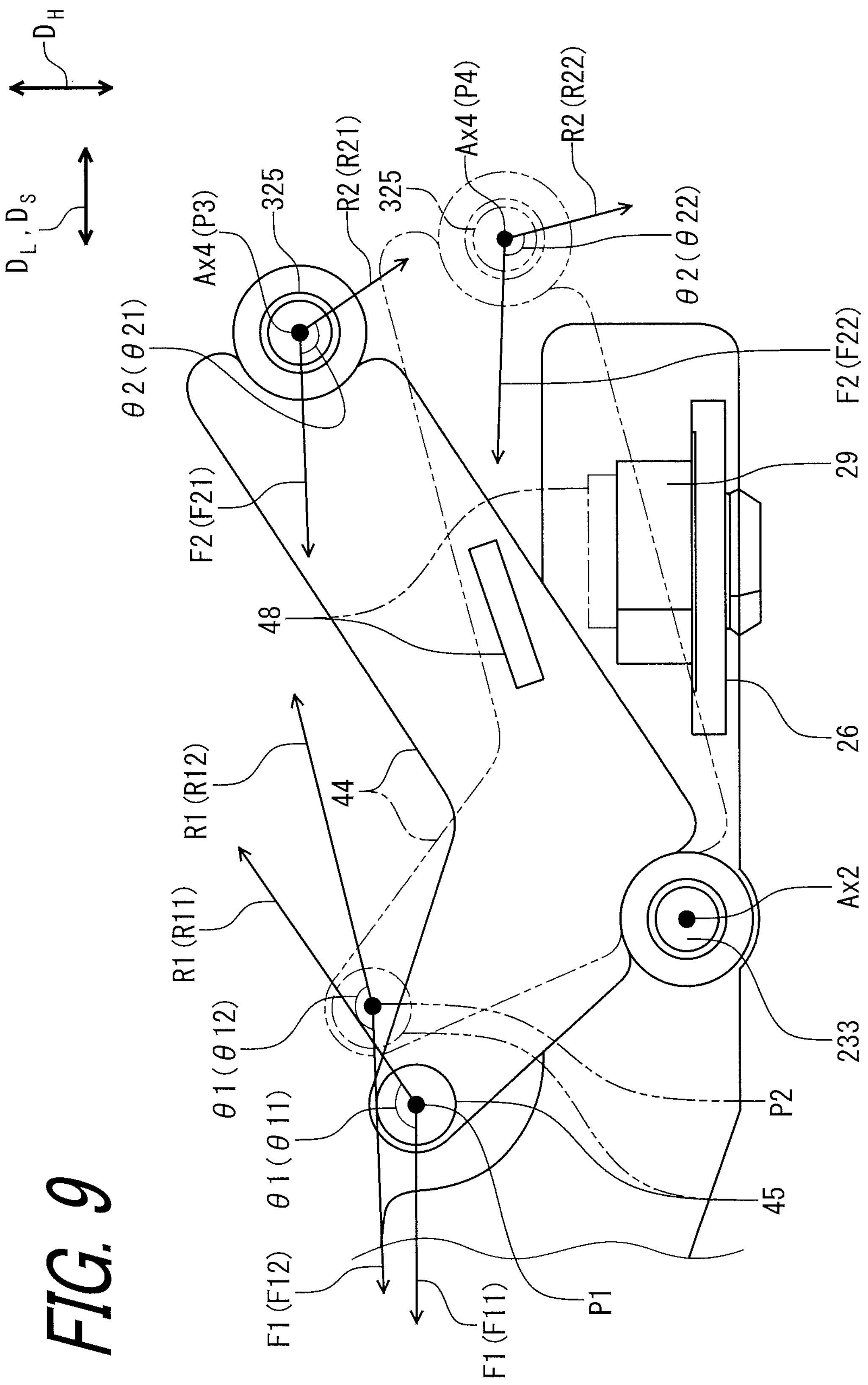
FIG. 9 is a schematic explanatory view indicating a shiftable range of the seat suspension according to the first embodiment.

FIG. 9 is a schematic explanatory view indicating shiftable ranges of the second link 43 and the second additional link 44 particularly in the seat suspension 20. FIG. 9 depicts, with solid lines, the second additional link 44, the link hook 45, the stopper 48, and the pin 325 in a state where the link extension 42*a* depicted in FIG. 5 is in contact with the lower surface of the upper flange 32*a* of the right Z bar 32R (the seat 58 is vacant and the link hook 45 is stationary). FIG. 9 depicts, with two-dot chain lines, the second additional link 44, the link hook 45, the stopper 48, and the pin 325 in a state where the stopper 48 is in contact with the stopper cushion rubber member 29. According to FIG. 9, the link hook 45 is obviously shiftable within a range above the second rotational axis Ax2 in the height direction $D_H$ and ahead of the second rotational axis Ax2 in the seat anteroposterior direction $D_L$. The link hook 45 is thus disposed such that a first angle θ1 between a direction F1 of contraction of the elastic members 46 and 47 and a rotation direction of the link hook 45 increases as the elastic members 46 and 47 expand. Specifically, assume that the first angle θ1 has an angle θ11 when the link hook 45 is located at a first position P1 in the state where the seat 58 is vacant and the link hook 45 is stationary, and the first angle θ1 has an angle θ12 when the link hook 45 is located at a second position P2 in the state where the link extension 42*a* is in contact with the lower surface of the upper flange 32*a* of the right Z bar 32R. In this case, the angle θ12 is larger than the angle θ11. The angle θ12 is more approximate to 180 degrees than the angle θ11. The first angle θ1 gradually increases from the angle θ11 to the angle θ12 as the link hook 45 shifts from the first position P1 to the second position P2.

Figure 10:
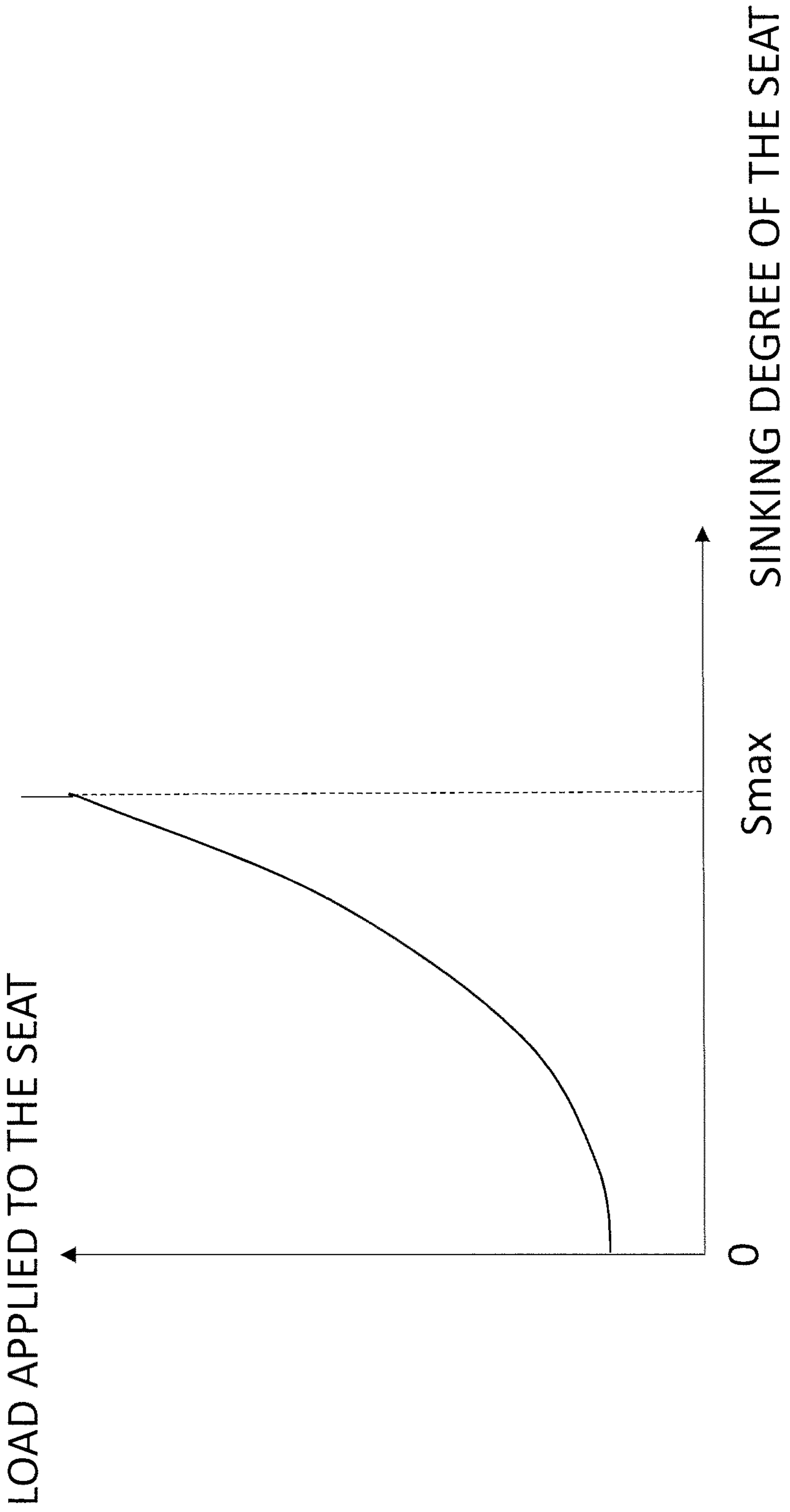
FIG. 10 is a graph indicating relation between a sinking degree of the seat and a load applied to the seat.

FIG. 10 is a graph indicating relation between a sinking degree of the seat 58 and a load applied to the seat. FIG. 10 indicates a maximum seat sinking degree 0 corresponding to a sinking degree of the seat 58 in the case where the link hook 45 is located at the first position P1, and a seat maximum sinking degree Smax corresponding to a sinking degree of the seat 58 in the case where the link hook 45 is located at the second position P2. As described above, spring expanding degree necessary for an increment of the sinking degree of the seat increases as the seat 58 sinks downward. As indicated in FIG. 10, the seat 58 is thus likely to sink when the seat 58 receives a small load. In other words, the seat 58 has small repulsive force. In contrast, the seat 58 is unlikely to sink when the seat 58 receives a large load. In other words, the seat 58 has large repulsive force. The seat suspension 20 accordingly provides the operator with a comfortable ride.

Meanwhile, as depicted in FIG. 9, the fourth rotational axis Ax4 is shiftable within a range above the second rotational axis Ax2 in the height direction $D_H$ and behind the second rotational axis Ax2 in the seat anteroposterior direction $D_L$. Assuming that the elastic members 46 and 47 are attached to the pin 325 as disclosed in JP 9-167817 A, a second angle θ2 between a direction F2 of contraction of the elastic members and the rotation direction of the link hook 45 decreases as the elastic members 46 and 47 expand. Specifically, assume that the second angle θ2 has an angle θ21 in the case where the link hook 45 is located at the first position P1, and the second angle θ2 has an angle θ22 in the case where the link hook 45 is located at the second position P2. In this case, the angle θ22 is smaller than the angle θ21. The angle θ22 is more approximate to 90 degrees than the angle θ21. The second angle θ2 gradually decreases from the angle θ21 to the angle θ22 as the link hook 45 shifts from the first position P1 to the second position P2.

Figure 11:
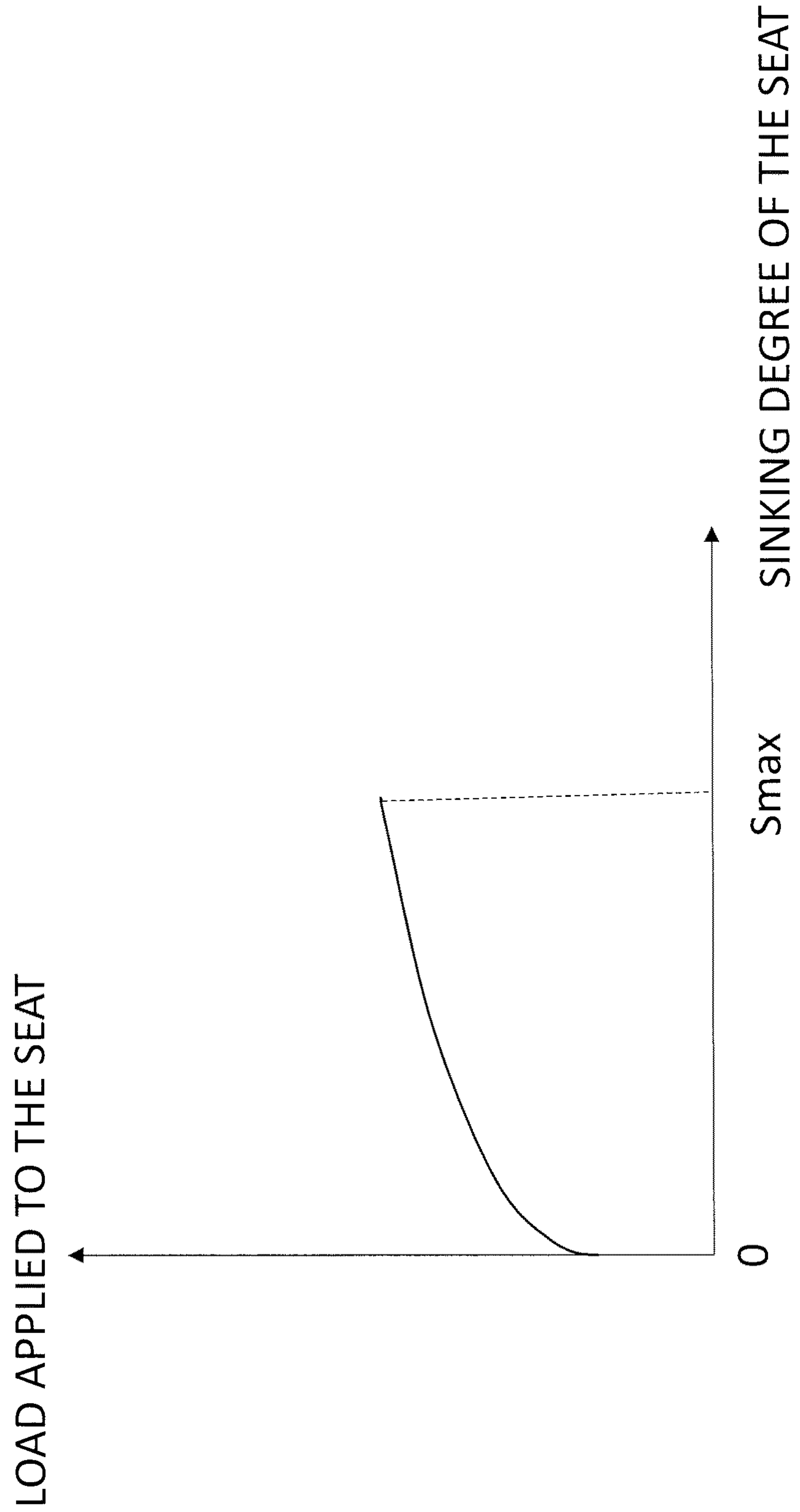
FIG. 11 is a graph indicating relation between a sinking degree of the seat and a load applied to the seat according to a comparative example.

FIG. 11 is a graph indicating relation between the sinking degree of the seat 58 and the load applied to the seat in this case. FIG. 11 also indicates the maximum seat sinking degree 0 corresponding to the sinking degree of the seat 58 in the case where the link hook 45 is located at the first position P1, and the seat maximum sinking degree Smax corresponding to the sinking degree of the seat 58 in the case where the link hook 45 is located at the second position P2. In contrast to the above embodiment, spring expanding degree necessary for the increment of the sinking degree of the seat 58 decreases as the seat 58 sinks downward. As indicated in FIG. 11, the seat 58 is thus likely to sink when the seat 58 receives a larger load. The technique disclosed in JP 9-167817 A thus needs an additional cushion inhibiting the seat 58 receiving a large load from sinking. The seat suspension 20 does not need such an additional cushion. The seat suspension 20 simply structured thus provides the operator with a comfortable ride.

With reference to FIG. 9, the first angle θ11 is larger than the second angle θ21 when the link hook 45 is located at the first position P1. In comparison to the seat suspension disclosed in JP 9-167817 A (a conventional seat suspension), the seat suspension 20 effectively utilizes tension of the elastic members 46 and 47 to exhibit a suspension function even in the state where the seat 58 receives a small load.

Second Embodiment

The seat suspension according to the present application includes the elastic members 46 and 47 that are not necessarily configured as disclosed in the first embodiment but may alternatively be constituted by compression springs. Described below in terms of a configuration is a seat suspension 120 according to the present embodiment. Portions similar to those in the seat suspension 20 according to the first embodiment will be denoted by identical reference signs and will not be described repeatedly. Portions of the seat suspension 120 not described in the present embodiment are assumed to be configured similarly to corresponding portions of the seat suspension 20.

Figure 12:
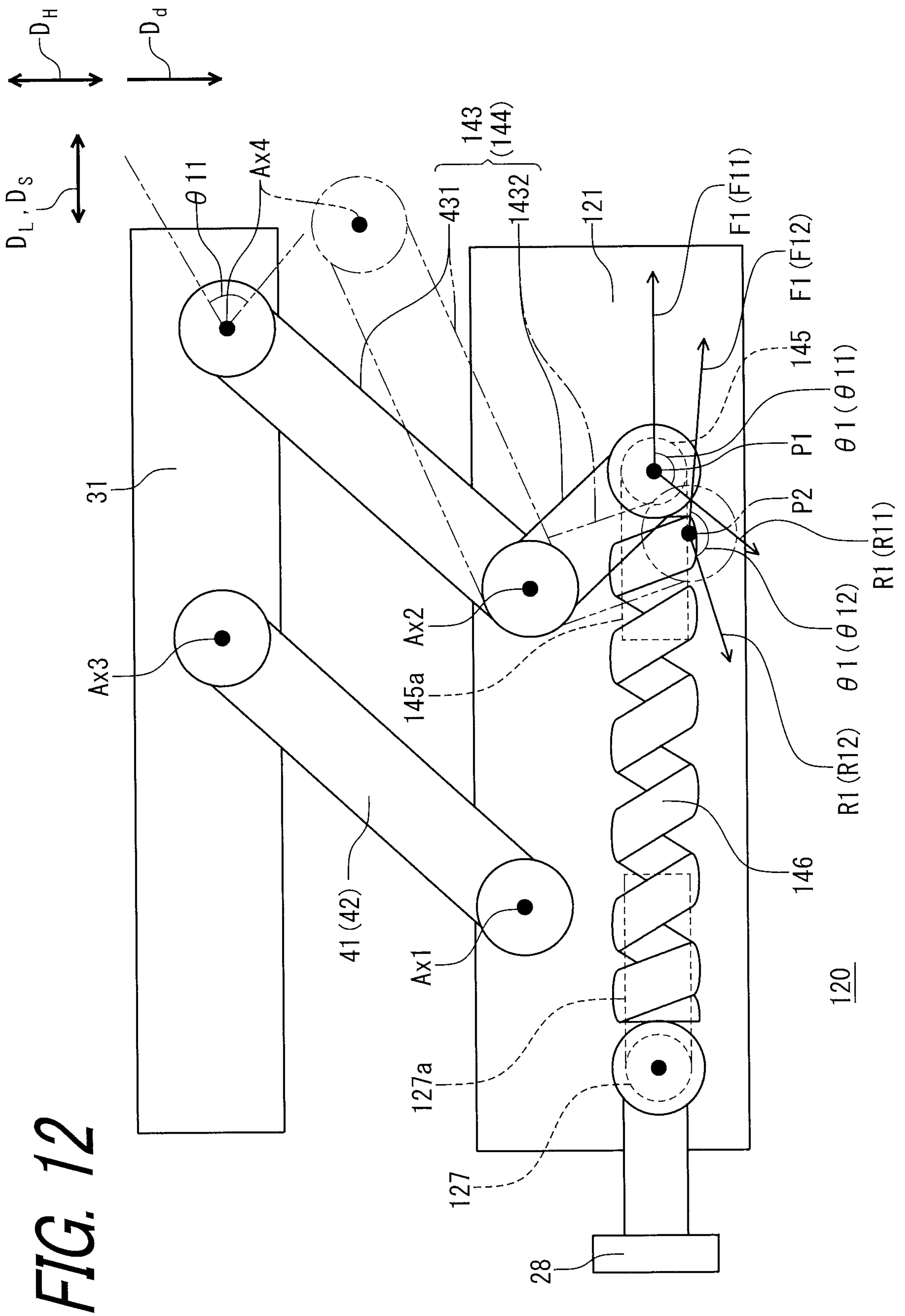
FIG. 12 is a schematic sectional view of a seat suspension according to a second embodiment.

FIG. 12 is a sectional view similar to FIG. 5, schematically depicting the seat suspension 120. The seat suspension 120 includes a base 121, the seat platform 31, the first link 41 (the first additional link 42), a second link 143 (a second additional link 144), a link hook 145, and an elastic member 146 constituted by a compression spring. The elastic member 146 is preferably constituted by a compressed coil spring. The base 121 is structured similarly to the base 21 according to the first embodiment except for a base hook 127. The base hook 127 is similar to the base hook 27 according to the first embodiment in that the base hook 127 is disposed closer to the first rotational axis Ax1 than to the second rotational axis Ax2 in the seat anteroposterior direction $D_L$. The base hook 127 is, however, different from the base hook 27 according to the first embodiment in that the base hook 127 includes a guide 127*a* fixed to the adjuster 28. When the guide 127*a* is inserted to an opening of the elastic member 146, the elastic member 146 is latched to the base hook 127.

The second link 143 includes the main arm 431 extending from the second rotational axis Ax2 to the fourth rotational axis Ax4 and an auxiliary arm 1432 extending from the main arm 431 to the link hook 145. The auxiliary arm 1432 extends from the second rotational axis Ax2 to the link hook 145 in a direction different from an extending direction of the auxiliary arm 437 (432) according to the first embodiment. The auxiliary arm 1432 extends in a direction allowing the link hook 145 to be shiftable within a range below the second rotational axis Ax2 in the height direction $D_H$ and behind the second rotational axis Ax2 in the seat anteroposterior direction $D_L$. In the case where the seat suspension 120 includes the second additional link 144, the second additional link 144 is structured similarly to the second link 143. The link hook 145 is different from the link hook 45 according to the first embodiment in that the link hook 145 includes a guide 145*a* fixed to the auxiliary arm 437. When the guide 145*a* is inserted to the opening of the elastic member 146, the elastic member 146 is latched to the link hook 145.

Assume that the link hook 145 is located at the first position P1 in a state where the seat 58 is vacant and the link hook 145 is stationary, and the link hook 145 is located at the second position P2 in a state where the seat 58 maximally sinks. The guide 127*a* and the guide 145*a* are desirably disposed to generally face each other when the link hook 145 is located between the first position P1 and the second position P2. When the link hook 145 is attached in this manner, the elastic member 146 presses the link hook 145 such that the link hook 145 becomes distant from the base hook 127. Furthermore, the guide 127*a* and the guide 145*a* are desirably disposed such that the first angle θ1 between the direction F1 of press of the elastic member 146 and a rotation direction R1 of the link hook 145 increases as the elastic member 146 contracts. Meanwhile, the fourth rotational axis Ax4 is shiftable within a range above the second rotational axis Ax2 in the height direction $D_H$ and behind the second rotational axis Ax2 in the seat anteroposterior direction $D_L$. The seat suspension 120 is thus effective similarly to the seat suspension 20 according to the first embodiment.

Third Embodiment

The seat suspension according to the present application includes the elastic members 46 and 47 that are not configured as disclosed in the first and second embodiments but may alternatively be latched to the base hook 27 and the pin 325 having a center axis along the fourth rotational axis Ax4. Described below in terms of a configuration is a seat suspension 220 according to the present embodiment. Portions similar to those in the seat suspension 20 according to the first embodiment will be denoted by identical reference signs and will not be described repeatedly. Portions of the seat suspension 220 not described in the present embodiment are assumed to be configured similarly to corresponding portions of the seat suspension 20.

Figure 13:
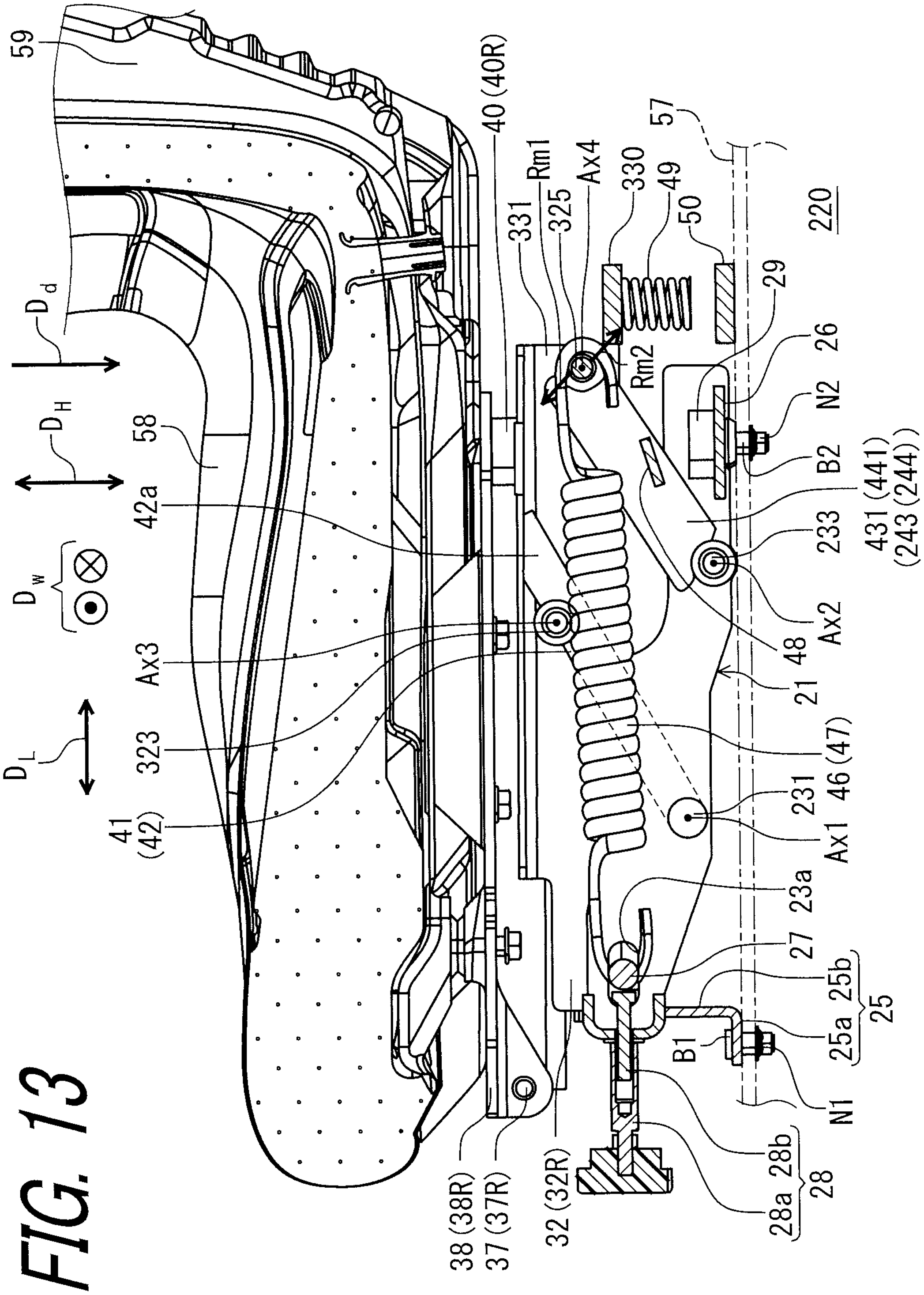
FIG. 13 is a schematic sectional view of a seat suspension according to a third embodiment.

FIG. 13 is a sectional view similar to FIG. 5, schematically depicting the seat suspension 220. The seat suspension 220 includes the base 21, the seat platform 31, the first link 41 (the first additional link 42), a second link 243 (a second additional link 244), and the elastic member 46 (the additional elastic member 47). The second link 243 (the second additional link 244) includes only the main arm 431 (441). As depicted in FIG. 13, the elastic member 46 (47) is latched to the base hook 27 and the pin 325 having a center axis along the fourth rotational axis Ax4, and pulls the fourth rotational axis Ax4 toward the base hook 27 such that the fourth rotational axis Ax4 rotates in a first rotation direction Rm1. The seat platform 31 has a seat platform first end 331 closer to the fourth rotational axis Ax4 than to the third rotational axis Ax3 in the seat anteroposterior direction $D_L$.

The seat suspension 220 further includes a spring placement part 330 provided at the seat platform first end 331 and extending in a second rotation direction Rm2 opposite to the first rotation direction Rm1, a compression spring 49 placed at the spring placement part 330 and extending downward Dd from the seat platform 31 toward the base 21, and a spring platform 50 provided below Dd the compression spring 49 to receive the compression spring 49. The spring platform 50 is placed on the floor panel 57.

In the seat suspension 220 according to the present embodiment, the compression spring 49 comes into contact with the spring platform 50 and generates upward reactive force when the seat 58 receives a large load and sinks, to inhibit the seat 58 from further sinking.

Fourth Embodiment

The seat suspension according to the present application may be configured such that the seat suspension 20, 120, or 220 according to the first, second, and third embodiment further includes a seating sensor. Described below in terms of a configuration is a seat suspension 320 according to the present embodiment. Portions similar to those in the seat suspensions 20, 120, and 220 according to the first to third embodiments will be denoted by identical reference signs and will not be described repeatedly. Portions of the seat suspension 320 not described in the present embodiment are assumed to be configured similarly to corresponding portions of the seat suspension 20.

Figure 14:
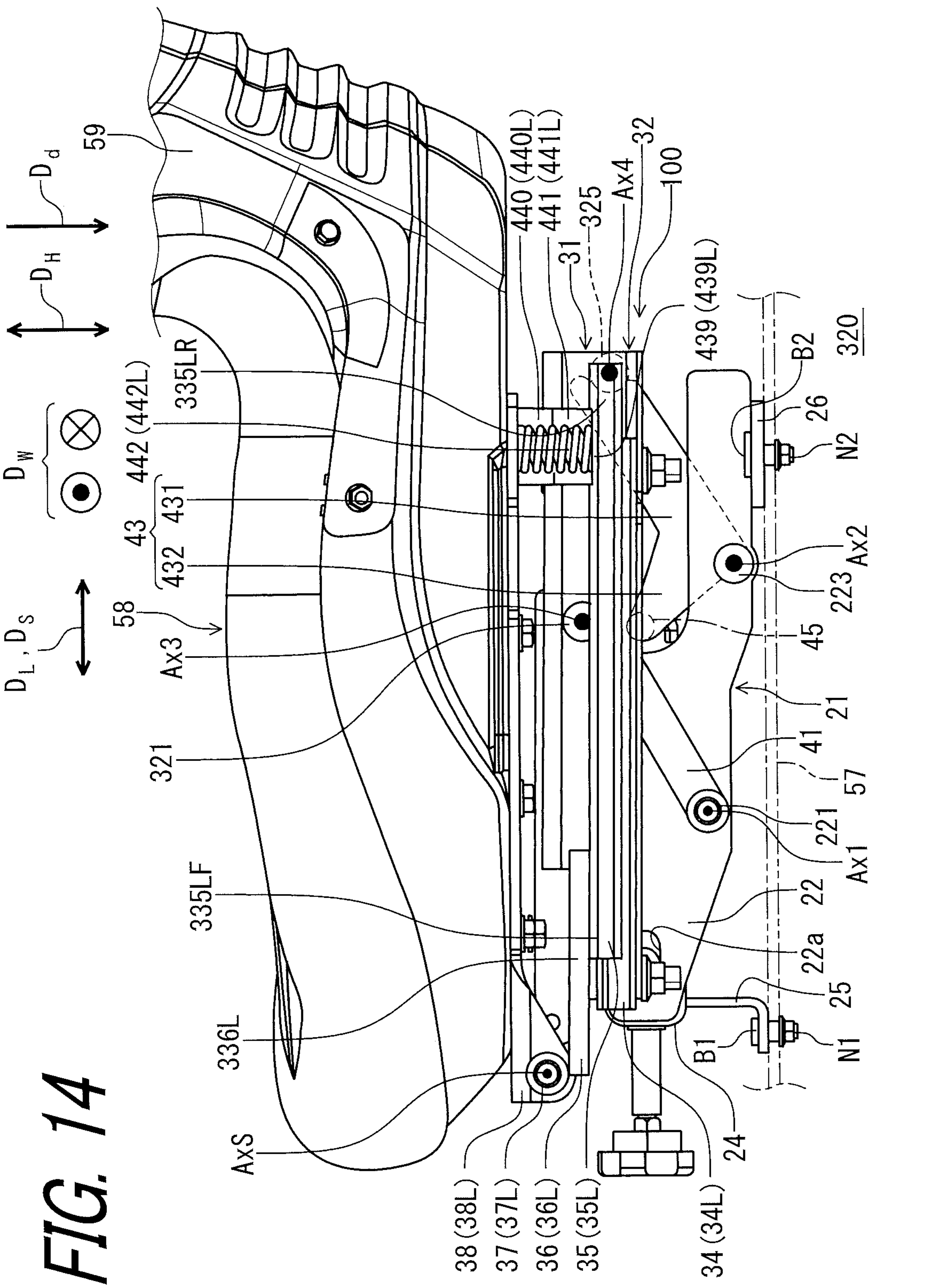
FIG. 14 is a side view of a seat, and a seat suspension according to a fourth embodiment.

With reference to FIG. 14, the seat suspension 320 includes, in place of the cushion mounting fitting 39 and the seat cushion rubber member 40 in the seat suspension 20 according to the first embodiment, a seat cushion rubber member 440, a seating switch 441, and a seat support compression spring 442. The slider 35 includes an extension 439. The seating switch 441 is mounted on the slider 35 whereas the seat cushion rubber member 440 is mounted on the seating switch 441. The seat support compression spring 442 is mounted on the extension 439.

The present embodiment provides a generally called seating detector 100 including the rail 34, the slider 35

(including the extension 439), the bracket attachment 36, the pin 37, the seat bracket 38, the seat cushion rubber member 440, the seating switch 441, and the seat support compression spring 442, which are provided on the seat platform 31 (in more detail, the Z bar 32).

Figure 15:
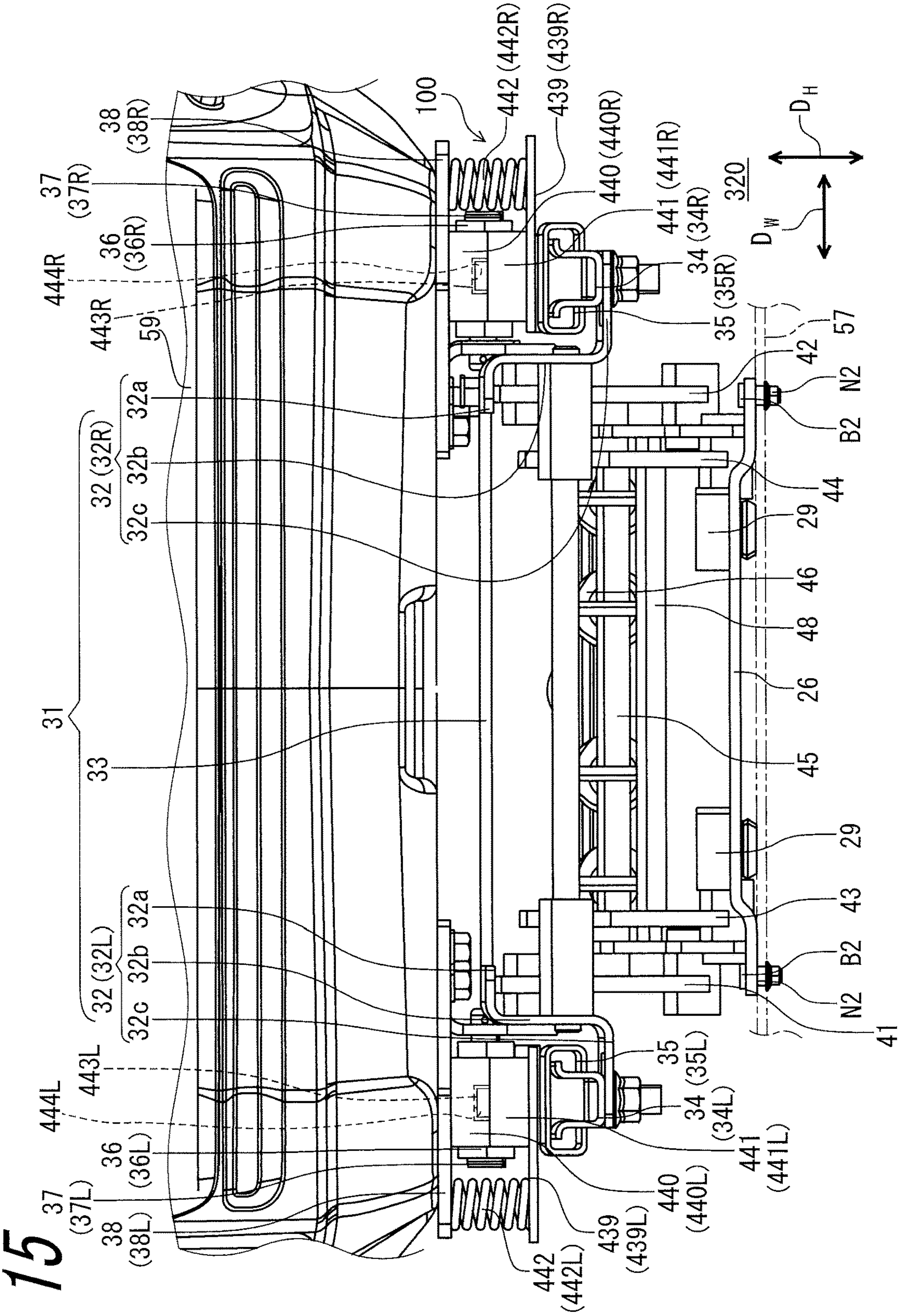
FIG. 15 is a rear view of a seat, and the seat suspension depicted in FIG. 14.

With reference to FIG. 15, the extension 439 included in the slider 35L is denoted as an extension 439L whereas the extension 439 included in the slider 35R is denoted as an extension 439R. The seat cushion rubber member 440, the seating switch 441, and the seat support compression spring 442 mounted on the slider 35L are denoted as a seat cushion rubber member 440L, a seating switch 441L, and a seat support compression spring 442L, respectively. The seat cushion rubber member 440, the seating switch 441, and the seat support compression spring 442 mounted on the slider 35R are denoted as a seat cushion rubber member 440R, a seating switch 441R, and a seat support compression spring 442R, respectively. That is, the seating detector 100 includes the rails 34L and 34R, the sliders 35L and 35R (including the extensions 439L and 439R, respectively), the seat cushion rubber member s 440L and 440R, the seating switches 441L and 441R, and the seat support compression springs 442L and 442R. The seating detector 100 may alternatively include only the single rail 34, the single slider 35, the single seat cushion rubber member 440, the single seating switch 441, and the single seat support compression spring 442. In this case, the single rail 34, the single slider 35, the single seat cushion rubber member 440, the single seating switch 441, and the single seat support compression spring 442 are preferably disposed at the center of the seat 58 in the width direction $D_W$.

With reference to FIG. 15, the seating switch 441L includes a switch button 443L mounted on the slider 35L in the height direction $D_H$ and configured to move substantially in the height direction $D_H$ to turn ON or turn OFF the seating detector. The seating switch 441R includes a switch button 443R mounted on the slider 35R in the height direction $D_H$ and configured to move substantially in the height direction $D_H$ to turn ON or turn OFF the seating detector. The switch buttons 443L and 443R may be attached onto the sliders 35L and 35R by means of an adhesive agent or attachment members (e.g. screws) not depicted. The sliders 35L and 35R receive the entire load applied to the seat 58, and the seating switches 441L and 441R are thus preferably disposed on the sliders 35L and 35R, respectively, in terms of seating detection accuracy.

The seat cushion rubber member 440L has a recess 444L and is mounted on the seating switch 441L and the slider 35L in the height direction $D_H$ such that the switch button 443L is inserted to the recess 444L. The seat 58 is mounted above the seat cushion rubber member 440L in the height direction $D_H$. The seat cushion rubber member 440R has a recess 444R and is mounted on the seating switch 441R and the slider 35R in the height direction $D_H$ such that the switch button 443R is inserted to the recess 444R. The seat 58 is mounted above the seat cushion rubber member 440R in the height direction $D_H$. The seat cushion rubber members 440L and 440R may be attached onto the seat brackets 38L and 38R, respectively, by means of an adhesive agent or attachment members (e.g. screws) not depicted. The seat cushion rubber members 440L and 440R may alternatively be attached onto the sliders 35L and 35R by means of attachment members (such as the cushion mounting fittings 39L and 39R) not depicted, or the like. Even in a case where the operator is seated rather on the right or the left, the seat cushion rubber members 440L and 440R are elastically deformed to press the switch buttons 443L and 443R in the height direction $D_H$, respectively. This configuration thus improves seating detection accuracy of the seating detector 100.

The extension 439L extends in the width direction $D_W$. More specifically, the extension 439L extends in the width direction $D_W$ and a direction distant from the rail 34R (to the left). The extension 439R extends in the width direction $D_W$. More specifically, the extension 439R extends in the width direction $D_W$ and a direction distant from the rail 34L (to the right).

The seat support compression spring 442L is mounted on the extension 439L and is in contact with the extension 439L and the seat bracket 38L. The seat support compression spring 442L presses upward the seat 58 in the height direction $D_H$ with respect to the extension 439L. The seat support compression spring 442L is close to the seating switch 441L, and is disposed opposite (on the left) to the position (on the right) of the slider 35R with respect to the seating switch 441L in the width direction $D_W$. The seat support compression spring 442R is mounted on the extension 439R and is in contact with the extension 439R and the seat bracket 38R. The seat support compression spring 442R presses upward the seat 58 in the height direction $D_H$ with respect to the extension 439R. The seat support compression spring 442R is close to the seating switch 441R, and is disposed opposite (on the right) to the position (on the left) of the slider 35L with respect to the seating switch 441R in the width direction $D_W$. The seat support compression spring 442L has a spring constant and a free length to reliably turn OFF the seating switch 441L when the operator is not seated on the seat 58 and reliably turn ON the seating switch 441L when the seat 58 receives at least a predetermined load. The seat support compression spring 442R has a spring constant and a free length to reliably turn OFF the seating switch 441R when the operator is not seated on the seat 58 and reliably turn ON the seating switch 441R when the seat 58 receives at least a predetermined load. The seat support compression spring 442L is fixed to the extension 439L and the seat bracket 38L in accordance with a known method adopting a counterbore, a washer, or the like. Similarly, the seat support compression spring 442R is fixed to the extension 439R and the seat bracket 38R in accordance with a known method adopting a counterbore, a washer, or the like.

Figure 16:
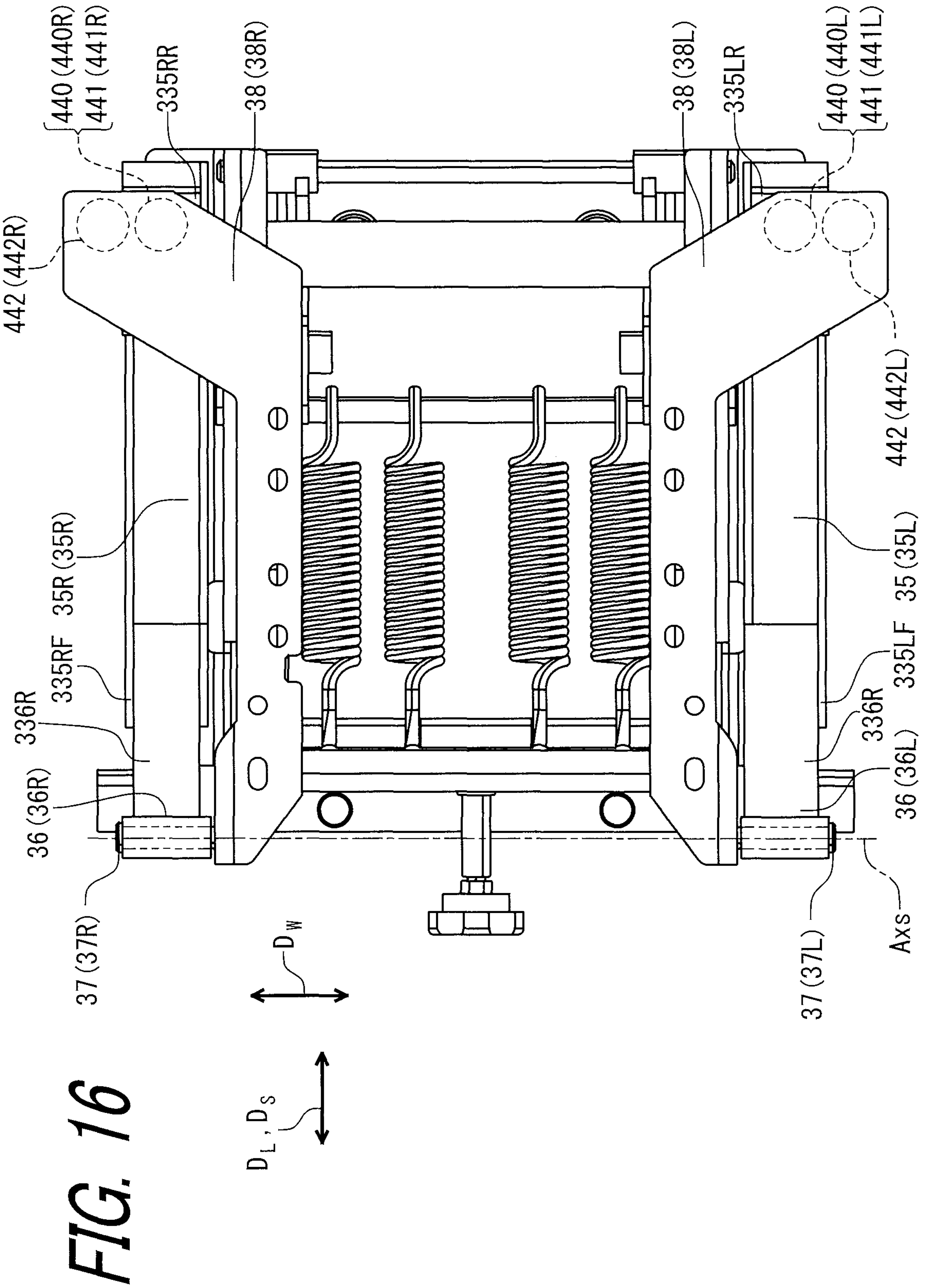
FIG. 16 is a top view of the seat suspension depicted in FIG. 14.

With reference to FIG. 16, the bracket attachment 36L is provided at a front end 335LF as an end of the slider 35L in the sliding direction $D_s$ and supports the seat bracket 38L. The seating switch 441L is mounted on a rear end 335LR, as an end opposite to the front end 335LF, of the slider 35L in the sliding direction $D_s$. As depicted in FIG. 14, the seating switch 441L is mounted on the seat platform 31 so as to be closer to the fourth rotational axis Ax4 than to the third rotational axis Ax3 in the sliding direction $D_s$. As described in the first embodiment, the bracket attachment 36L supports the seat bracket 38L via the pin 37L extending substantially perpendicularly to the sliding direction $D_s$. The bracket attachment 36L has an extension plate 336L extending forward from the front end 335LF of the slider 35L, and the extension plate 336L has a front end supporting the pin 37L. As depicted in FIG. 14, the pin 37L is thus positioned below $D_d$ a front end of the seat 58 in the height direction $D_H$.

Similarly, with reference to FIG. 16, the bracket attachment 36R is provided at a front end 335RF as an end of the slider 35R in the sliding direction $D_s$ and supports the seat bracket 38R. The seating switch 441R is mounted on a rear end 335RR, as an end opposite to the front end 335RF, of the slider 35R in the sliding direction $D_s$. Similarly to the seating switch 441L, the seating switch 441R is mounted on the seat platform 31 so as to be closer to the fourth rotational axis Ax4 than to the third rotational axis Ax3 in the sliding direction $D_s$. As described in the first embodiment, the bracket attachment 36L supports the seat bracket 38R via the pin 37R extending substantially perpendicularly to the sliding direction $D_s$. The bracket attachment 36R has an extension plate 336R extending forward from the front end 335RF of the slider 35R, and the extension plate 336R has a front end supporting the pin 37R. Similarly to the pin 37L, the pin 37R is thus positioned below $D_d$ the front end of the seat 58 in the height direction $D_H$.

The pin 37L and the pin 37R have the common center shaft $A_{XS}$. The bracket attachment 36L supports the seat bracket 38L rotatably about the center shaft $A_{XS}$ of the pin 37L. The bracket attachment 36R supports the seat bracket 38R rotatably about the center shaft $A_{XS}$ of the pin 37R. As described above, the seat cushion rubber member 440L and the seating switch 441L are disposed distant from a fulcrum (the center shaft $A_{XS}$ of the pin 37L), to largely receive force due to the load applied to the seat 58 in accordance with the lever rule. Similarly, the seat cushion rubber member 440R and the seating switch 441R are disposed distant from a fulcrum (the center shaft $A_{XS}$ of the pin 37R), to largely receive force due to the load applied to the seat 58 in accordance with the lever rule. The seating switch 441L and the seating switch 441R accordingly enable accurate detection of seating onto the seat 58.

The seat support compression spring 442L is disposed close to the seating switch 441L, so that the seating switch 441L can be promptly turned OFF when the seating on the seat 58 ends. As depicted in FIGS. 14 and 15, the seat support compression spring 442L is disposed opposite (on the left) to the position (on the right) of the slider 35R with respect to the seating switch 441L in the width direction $D_W$. The seat 58 can thus be inhibited from largely leaning in the width direction $D_W$ even in a case where the operator is seated rather on the left portion of the seat 58.

Similarly, the seat support compression spring 442R is disposed close to the seating switch 441R, so that the seating switch 441R can be promptly turned OFF when the seating on the seat 58 ends. As depicted in FIGS. 14 and 15, the seat support compression spring 442R is disposed opposite (on the right) to the position (on the left) of the slider 35L with respect to the seating switch 441R in the width direction $D_W$. The seat 58 can thus be inhibited from largely leaning in the width direction $D_W$ even in a case where the operator is seated rather on the right portion of the seat 58.

As depicted in FIGS. 14 and 16, the seat 58 is placed on the seat bracket 38 such that the backrest 59 of the seat 58 is closer to the rear end 335LR than to the front end 335LF of the slider 35L in the sliding direction $D_s$ and is closer to the rear end 335RR than to the front end 335RF of the slider 35R. Each of the seating switches 441L and 441R are thus likely to receive a load when the operator leans on the backrest 59. The seating switch 441L and the seating switch 441R accordingly enable accurate detection of seating onto the seat 58.

In the present embodiment, one of the rails 34L and 34R may be called a first rail and the other may be called a second rail. One of the sliders 35L and 35R mounted on the first rail may be called a first slider and the other mounted on the second rail may be called a second slider. One of the front ends 335LF and 335RF of the first slider may be called a first end and the other of the second slider may be called a third end. One of the rear ends 335LR and 335RR of the first slider may be called a second end and the other of the second slider may be called a fourth end. One of the extensions 439L and 439R included in the first slider may be called a first extension and the other included in the second slider may be called a second extension. One of the seating switches 441L and 441R mounted on the first slider may be called a first seating switch and the other mounted on the second slider may be called a second seating switch. One of the switch buttons 443L and 443R of the first seating switch may be called a first switch button, and the other of the second seating switch may be called a second switch button. One of the seat cushion rubber members 440L and 440R mounted on the first seating switch may be called a first elastic member, and the other mounted on the second seating switch may be called a second elastic member. One of the recesses 444L and 444R included in the first elastic member may be called a first recess and the other included in the second elastic member may be called a second recess. One of the seat support compression springs 442L and 442R mounted on the first extension may be called a third elastic member, and the other mounted on the second extension may be called a fourth elastic member. One of the bracket attachments 36L and 36R attached onto the first slider may be called a first bracket attachment and the other attached onto the second slider may be called a second bracket attachment. One of the pins 37L and 37R attached to the first bracket attachment may be called a first pin and the other attached to the second bracket attachment may be called a second pin.

Modification Examples

The structure fixing the base 21 to the floor panel 57, the structure restricting shift of the seat 58 by means of the link extensions 41*a* and 42*a* and the stopper 48, the structure and the shape of the seat bracket 38 according to any one of the above embodiments are not limited to those described above, but the present application may adopt any alternative structure achieving a similar function. For example, the seat brackets 38 may not necessarily include the two seat brackets 38L and 38R, but may alternatively include only one or at least three brackets. In any one of the first to third embodiments, at least one of the rail 34, the slider 35, the bracket attachment 36, the pin 37, the cushion mounting fitting 39, and the seat cushion rubber member 40 may not be provided and the seat bracket 38 may be mounted directly to the seat platform 31.

The present application refers to words “include” and derivatives as nonrestrictive terms for description of provision of constituent elements, without exclusion of any other constituent element not referred to in the present application. The same applies to words “have”, “provided with”, and derivatives thereof.

Expressions “member”, “part”, “element”, “body”, and “structure” may have a plurality of meanings indicating a single portion and a plurality of portions.

Ordinal numbers “first”, “second”, and the like are terms for simple distinction among configurations, without having any other meaning (e.g. specific order). For example, provision of a “first element” does not indicate provision of a “second element”, and provision of the “second element” does not indicate provision of the “first element”.

Expressions “substantially”, “approximately”, “about”, and the like indicating degrees may each have a rational deviation not significantly changing a final result. All the numerical values referred to in the present application may be interpreted as including any one of the expressions “substantially”, “approximately”, “about”, and the like.

In view of the above disclosure, the present invention can obviously include various modifications and alterations. The present invention may thus be implemented in any manner different from those specifically disclosed in the present application without departing from the spirit of the preset invention.

Obviously, numerous modifications and variations of the present invention are possible in light of the above teachings. It is therefore to be understood that within the scope of the appended claims, the invention may be practiced otherwise than as specifically described herein.

What is claimed is:

1. A seat suspension comprising:

a base having a first rotational axis and a second rotational axis substantially parallel to the first rotational axis, the first rotational axis and the second rotational axis being provided to have a first distance in a distant direction between the first rotational axis and the second rotational axis, the base including a base hook provided closer to the first rotational axis than to the second rotational axis in a seat anteroposterior direction substantially perpendicular to both the first rotational axis and the second rotational axis;

a seat platform having a third rotational axis substantially parallel to the first rotational axis and a fourth rotational axis substantially parallel to the second rotational axis, the third rotational axis and the fourth rotational axis being provided to have the first distance in the distant direction between the third rotational axis and the fourth rotational axis;

a seat bracket provided on the seat platform in a height direction substantially perpendicular to the seat anteroposterior direction and the second rotational axis, a seat being configured to be attached to the seat bracket such that the seat has a backrest positioned closer to the fourth rotational axis than to the third rotational axis in the seat anteroposterior direction;

a first link coupling the first rotational axis and the third rotational axis such that a distance between the first rotational axis and the third rotational axis is a second distance, the first link being configured to be rotatable about the first rotational axis and the third rotational axis;

a second link coupling the second rotational axis and the fourth rotational axis such that a distance between the second rotational axis and the fourth rotational axis is the second distance, the second link being configured to be rotatable about the second rotational axis and the fourth rotational axis;

a link hook provided on the second link; and an elastic member latched to the base hook and the link hook and configured to pull the link hook toward the base hook, the link hook being provided such that a first angle between a contracting direction of the elastic member and a rotation direction of the link hook increases as the elastic member expands, the link hook moving in the rotation direction around the second rotational axis as the elastic member expands, wherein the link hook is shiftable within a region defined between the first rotational axis and the second rotational axis in the seat anteroposterior direction and between the second rotational axis and the seat bracket in the height direction.

2. The seat suspension according to claim 1, wherein the fourth rotational axis is shiftable within a region defined between the seat bracket and the second rotational axis in the height direction and behind the second rotational axis in the seat anteroposterior direction such that the second rotational axis is provided between the fourth rotational axis and the first rotational axis in the seat anteroposterior direction.

3. The seat suspension according to claim 2, wherein the second link includes a main arm extending from the second rotational axis to the fourth rotational axis, and an auxiliary arm extending from the main arm to the link hook.

4. The seat suspension according to claim 3, wherein the auxiliary arm extends from the second rotational axis toward the link hook.

5. The seat suspension according to claim 4, wherein, when viewed in a width direction substantially parallel to the second rotational axis, a direction from the second rotational axis to the fourth rotational axis and a direction from the second rotational axis to the link hook form an angle having substantially 90 degrees.

6. The seat suspension according to claim 1, wherein, when the link hook is located at a first position in a state where the seat is vacant and the link hook is stationary, the first angle is larger than an angle between a direction from the fourth rotational axis to the base hook and an additional rotation direction in which the fourth rotational axis rotates around the second rotational axis as the elastic member expands.

7. The seat suspension according to claim 1, wherein the base further includes an adjuster connected to the base hook and configured to adjust positioning of the base hook in the seat anteroposterior direction.

8. The seat suspension according to claim 1, further comprising:

a first additional link disposed opposite to the first link with respect to the elastic member in a width direction substantially parallel to the second rotational axis and coupling the first rotational axis and the third rotational axis, the first additional link being configured to be rotatable about the first rotational axis and the third rotational axis; and a second additional link disposed opposite to the second link with respect to the elastic member in the width direction and coupling the second rotational axis and the fourth rotational axis, the second additional link being configured to be rotatable about the second rotational axis and the fourth rotational axis.

9. The seat suspension according to claim 8, further comprising:

at least one additional elastic member provided between the first link and the first additional link and between the second link and the second additional link in the width direction and latched to the base hook and the link hook to pull the link hook toward the base hook.

10. The seat suspension according to claim 1, further comprising:

a rail provided on the seat platform and extending in the seat anteroposterior direction; and a slider mounted on the rail and configured to be slidable on the rail in the seat anteroposterior direction, a seat being configured to be provided on the slider in the height direction.

11. The seat suspension according to claim 1, wherein the elastic member is a tension spring.

* * * * *